United States Patent
Faulkner

(10) Patent No.: US 11,627,140 B2
(45) Date of Patent: Apr. 11, 2023

(54) AUTOMATIC CONFIGURATION AND MANAGEMENT OF USER PERMISSIONS BASED ON ROLES AND USER ACTIVITY

(71) Applicant: MICROSOFT TECHNOLOGY LICENSING, LLC, Redmond, WA (US)

(72) Inventor: Jason Thomas Faulkner, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 116 days.

(21) Appl. No.: 17/060,075

(22) Filed: Sep. 30, 2020

(65) Prior Publication Data

US 2022/0103566 A1 Mar. 31, 2022

(51) Int. Cl.
| | |
|---|---|
| H04L 29/06 | (2006.01) |
| H04L 9/40 | (2022.01) |
| H04L 43/16 | (2022.01) |
| H04L 67/06 | (2022.01) |
| H04L 67/50 | (2022.01) |

(52) U.S. Cl.
CPC ........... *H04L 63/105* (2013.01); *H04L 43/16* (2013.01); *H04L 63/101* (2013.01); *H04L 63/102* (2013.01); *H04L 63/20* (2013.01); *H04L 67/06* (2013.01); *H04L 67/535* (2022.05)

(58) Field of Classification Search
None
See application file for complete search history.

(56) References Cited

U.S. PATENT DOCUMENTS

| | | | |
|---|---|---|---|
| 6,885,388 B2 | 4/2005 | Gunter et al. | |
| 8,560,612 B2 | 10/2013 | Kilmer et al. | |
| 8,739,045 B2 | 5/2014 | Pang | |
| 2004/0141605 A1 | 7/2004 | Chen et al. | |
| 2013/0007635 A1* | 1/2013 | Michaelis | H04M 3/56 715/753 |

(Continued)

OTHER PUBLICATIONS

"ClickMeeting", Retrieved from: https://web.archive.org/web/20160826184624/https://knowledge.clickmeeting.com/uploads/2015/09/clickmeeting_security_policy.pdf, Aug. 26, 2016, 6 Pages.

(Continued)

*Primary Examiner* — Natisha D Cox
(74) *Attorney, Agent, or Firm* — Newport IP, LLC; Scott Y. Shigeta

(57) ABSTRACT

The techniques disclosed herein provide automatic escalation and de-escalation of roles and permissions based on user activity of a communication system. Initial event parameters, such as an event attendee list and a meeting type, can be established by a user input. The system can then determine an initial set of roles and permissions for each attendee. A system can then monitor user activity associated with the event to generate a queue of activities. When the system detects that one or more activities satisfies given criteria, the system can escalate or de-escalate the roles and permissions for specific attendees. By dynamically controlling granular levels of permissions in a timely manner based on the detection of specific activities, a system can improve the security of stored data as well as improve the efficiency of detected collaborative event scenarios.

20 Claims, 21 Drawing Sheets

(56) References Cited

U.S. PATENT DOCUMENTS

| | | | |
|---|---|---|---|
| 2015/0356516 A1* | 12/2015 | Kagan | G06Q 10/1095 705/7.19 |
| 2018/0007097 A1* | 1/2018 | Malatesha | H04L 65/1093 |
| 2018/0232705 A1* | 8/2018 | Baker | G06F 3/04817 |
| 2019/0228176 A1* | 7/2019 | Fishbeck | H04L 9/0816 |
| 2020/0186375 A1* | 6/2020 | Faulkner | H04L 12/1822 |
| 2020/0243095 A1* | 7/2020 | Adlersberg | G06F 40/216 |

OTHER PUBLICATIONS

"Manage Meeting Attendees in Adobe Connect", Retrieved from: https://helpx.adobe.com/in/adobe-connect/using/attendees.html, Oct. 5, 2018, 11 Pages.

"Meeting Capabilities and Meeting Sponsors in Cisco Webex Teams", Retrieved from: https://help.webex.com/en-us/uxg1zl/Meeting-Capabilities-and-Meeting-Sponsors-in-Cisco-Webex-Teams, Retrieved on Apr. 15, 2020, 5 Pages.

"Using Avaya Aura® Conferencing Collaboration Agent", Retrieved from: https://downloads.avaya.com/css/P8/documents/101021832, Mar. 2016, 94 Pages.

Redmond, Tony, "How to Assign Presenters in a Teams Meeting", Retrieved from: https://office365itpros.com/2019/12/09/assign-presenters-teams-meeting/, Dec. 9, 2019, 9 pages.

\* cited by examiner

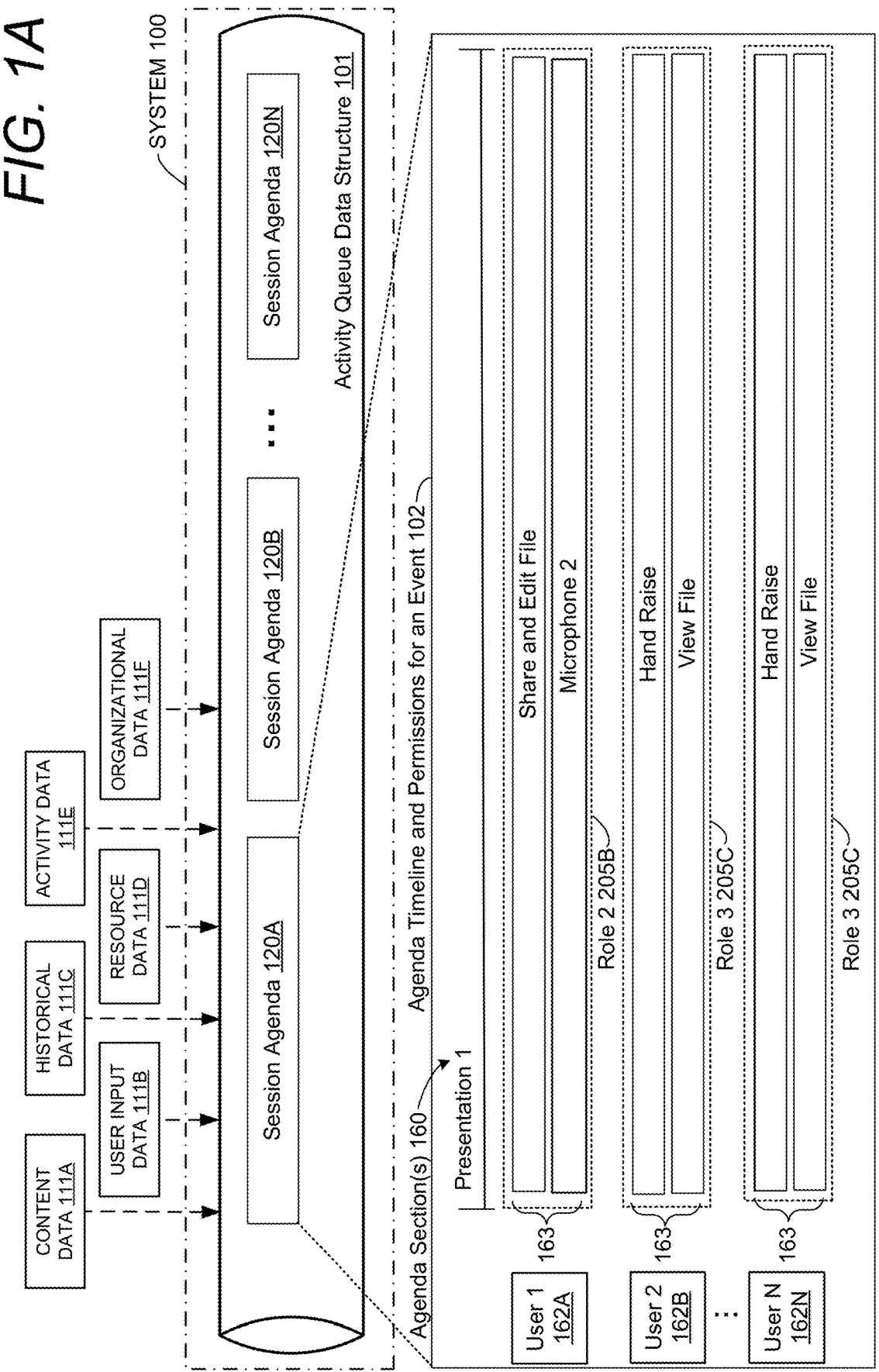

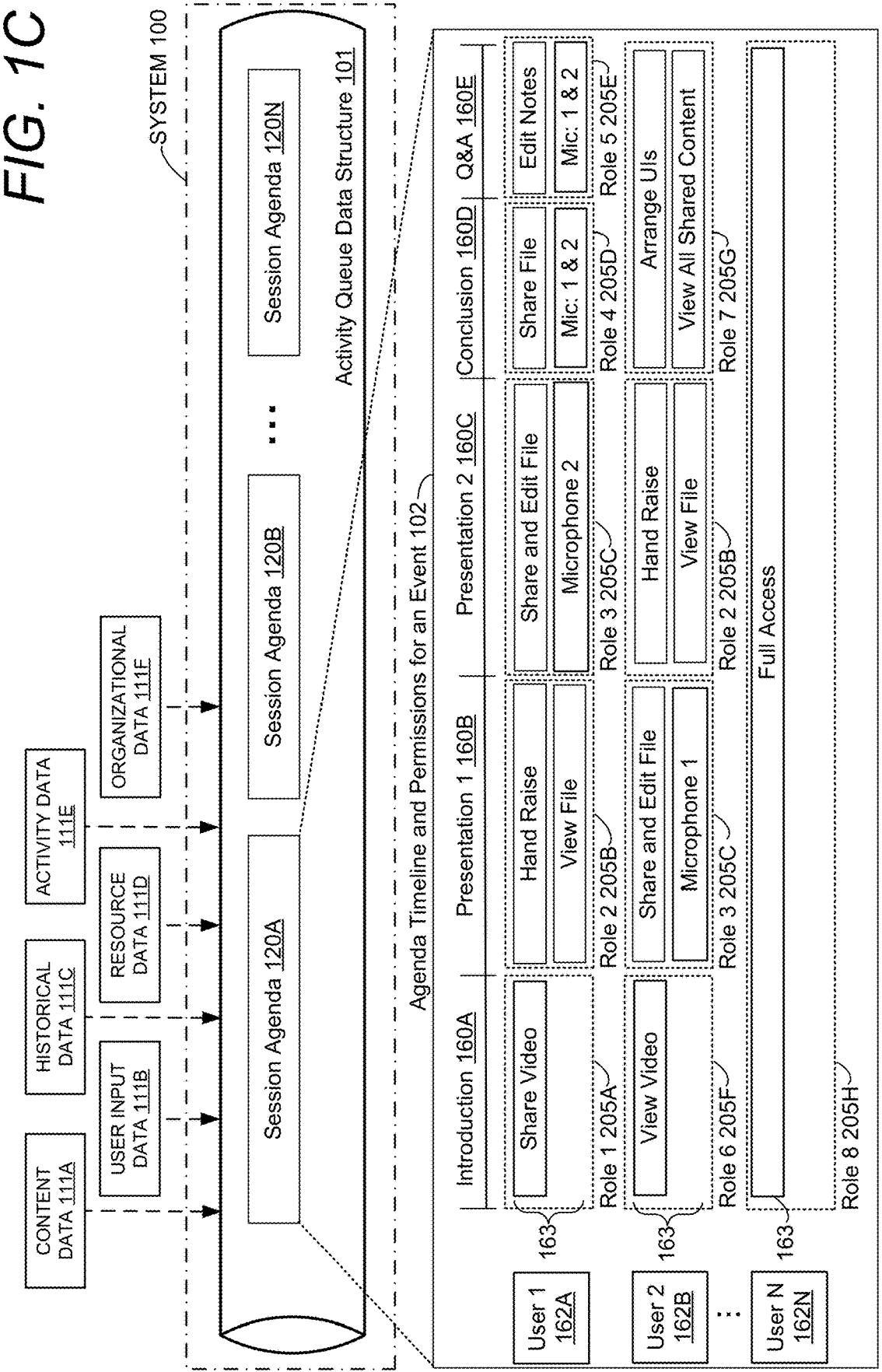

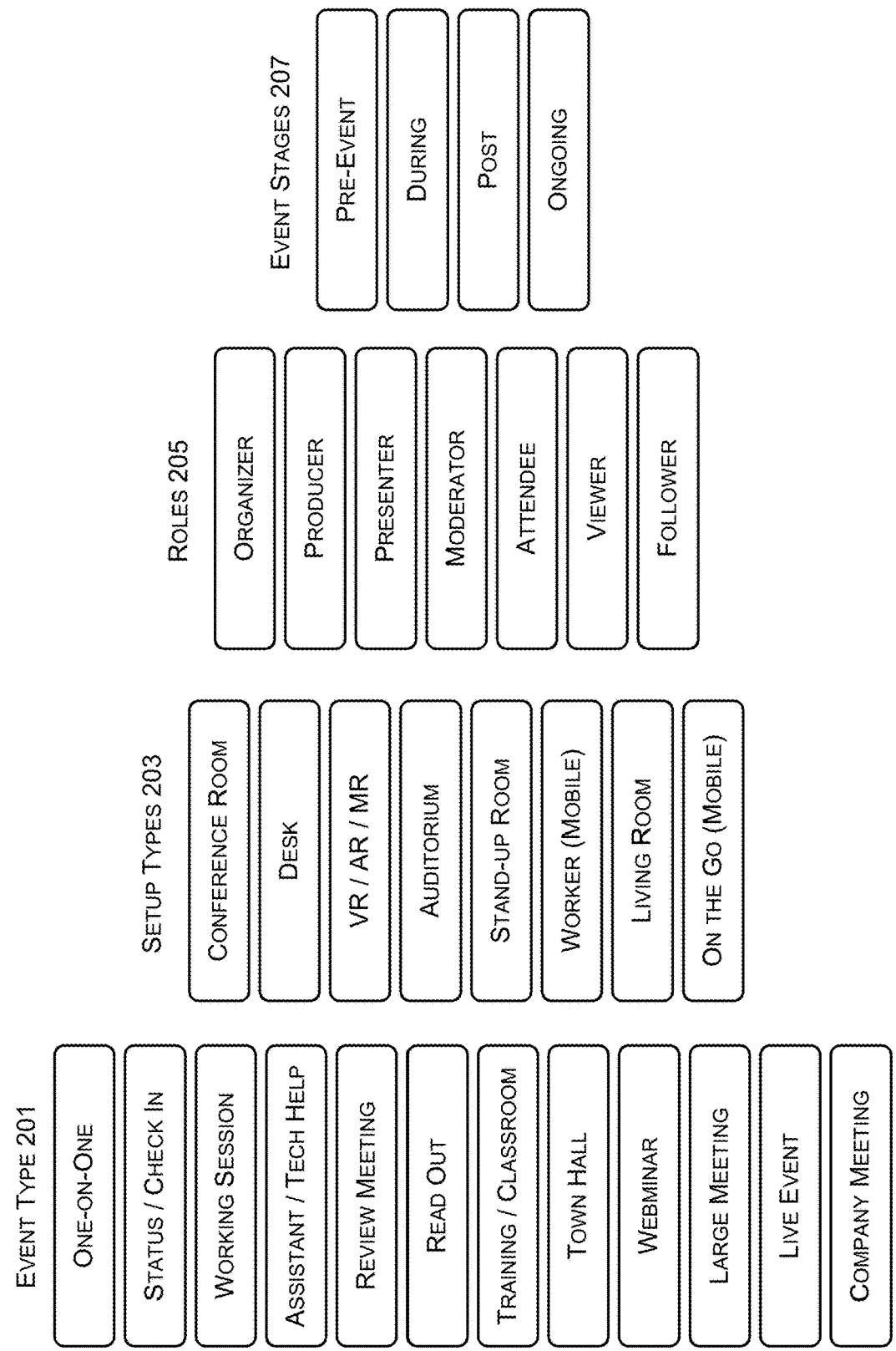

Sales Analysis Review  DETAILS  CHAT  FILES  +

CONF ROOM 2/3425

STATUS / CHECK IN

SUGGESTED  SUGGESTED

PARTICIPANTS

WEDNESDAY, JULY 23, 2025

| | |
|---|---|
| 10 AM | |
| 11 AM | Sales Analysis Review — 6 PARTICIPANTS |
| 12 PM | Team Meeting |
| 1 PM | Office Hours |
| 2 PM | |
| 3 PM | Design Review |
| 4 PM | |

Agenda Topics         Owner              Duration
Introduction              @Jason Faulkner    5 minutes
Overview and presentation @Jason Faulkner    25 minutes
Results                   @Jason Faulkner    5 minutes

Meeting Description
Review Sales Results for Prior Quarter

Action Items          Owner              Due Date
Create an Action Item     Add an Owner       Add Due Date

Notes
Add a Note

Activity · Chat · Teams · Calendar · Calls · Files · ... · Apps · Help

FIG. 4A

System analyzes contextual data related to participants and suggests an agenda outline, agenda items, and attachments

Sales Analysis Review *DETAILS* *CHAT* *FILES* +

CONF ROOM 2/3425

STATUS / CHECK IN

SUGGESTED    ADDED
SALES POLL   QUARTERLY SALES
EDIT POLL    EDIT SPREADSHEET

| Agenda Topics | Owner | Duration |
|---|---|---|
| Introduction | @Jason Faulkner | 5 minutes |
| Overview and presentation | @Jason Faulkner | 25 minutes |
| Quarterly Sales Results | @Serin Smith | 15 minutes |

Meeting Description
Review Sales Results for Prior Quarter

| Action Items | Owner | Due Date |
|---|---|---|
| Create an Action Item | Add an Owner | Add Due Date |

Notes
Add a Note

*PARTICIPANTS*

Organizer  Attendee
Presenter  +4

*WEDNESDAY, JULY 23, 2025*

10 AM
11 AM — Sales Analysis Review *6 PARTICIPANTS*
12 PM — Team Meeting
1 PM — Office Hours
2 PM
3 PM — Design Review
4 PM Activity | Chat | Teams | Calendar | Calls | Files | Apps | Help

SEARCH

*FIG. 4C*

Confirmation of the suggested file causes analysis of the file
Agenda item is updated based on the file contents and presented as a suggestion

FIG. 4D

Confirmation of the suggested agenda change causes an update to Role and Permissions of identified user
Owner of the agenda item is changed from Jason to Serin

FIG. 5A

Sales Analysis Review *Details Chat Files* +

CONF ROOM 2/3425

STATUS / CHECK IN

SUGGESTED — SALES POLL / EDIT POLL

ADDED — QUARTERLY SALES / EDIT SPREADSHEET

Agenda Topics

| | Owner | Duration |
|---|---|---|
| Introduction | @Jason Faulkner | 5 minutes |
| Overview and presentation | @Jason Faulkner | 25 minutes |
| Quarterly Sales Results | @Serin Smith | 15 minutes |

Meeting Description
Review Sales Results for Prior Quarter

Action Items
Create an Action Item

| Owner | Due Date |
|---|---|
| Add an Owner | Add Due Date |

Notes
Add a Note

*PARTICIPANTS*
+4
Organizer Attendee
Presenter Presenter

WEDNESDAY, JULY 23, 2025

- 10 AM
- 11 AM — Sales Analysis Review / 6 PARTICIPANTS
- 12 PM — Team Meeting
- 1 PM — Office Hours
- 2 PM
- 3 PM — Design Review
- 4 PM Activity | Chat | Teams | Calendar | Calls | Files | ooo | Apps | Help User edits to an agenda item

FIG. 5B

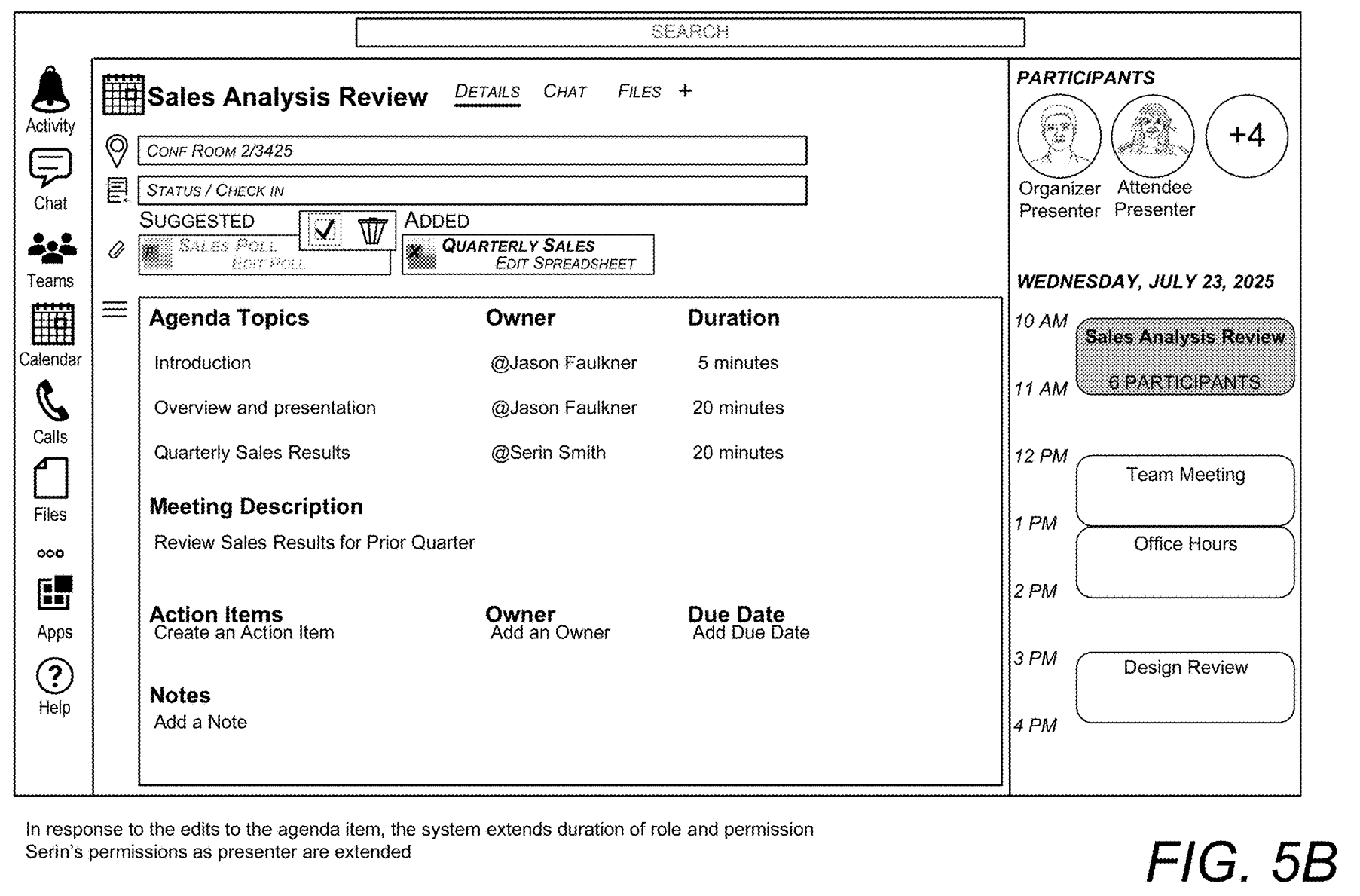

In response to the edits to the agenda item, the system extends duration of role and permission Serin's permissions as presenter are extended

Sales Analysis Review  DETAILS  CHAT  FILES  +

CONF ROOM 2/3425

STATUS / CHECK IN

SUGGESTED  ADDED
SALES POLL  QUARTERLY SALES
EDIT POLL  EDITED SPREADSHEET

| Agenda Topics | Owner | Duration |
|---|---|---|
| Introduction | @Jason Faulkner | 5 minutes |
| Overview and presentation | @Jason Faulkner | 20 minutes |
| Quarterly Sales Results | @Mike Allen | 20 minutes |

Meeting Description
Review Sales Results for Prior Quarter

| Action Items | Owner | Due Date |
|---|---|---|
| Create an Action Item | Add an Owner | Add Due Date |

Notes
Add a Note

*PARTICIPANTS*

Organizer   Attendee   Presenter
Presenter

WEDNESDAY, JULY 23, 2025

10 AM

11 AM  — Sales Analysis Review
         6 PARTICIPANTS

12 PM  — Team Meeting

1 PM   — Office Hours

2 PM

3 PM   — Design Review

4 PM

Activity, Chat, Teams, Calendar, Calls, Files, Apps, Help

In response to the edits to the file, the system modifies one or more roles and permissions
Serin is promoted to Moderator for a designated portion of the event

Sales Analysis Review _DETAILS_ _CHAT_ _FILES_ +

CONF ROOM 2/3425

STATUS / CHECK IN

ADDED       ADDED
QUARTERLY SALES    WORKSHOP RECORDING

Agenda Topics

| | Owner | Duration |
|---|---|---|
| Introduction | @Jason Faulkner | 5 minutes |
| Overview and presentation | @Jason Faulkner | 25 minutes |
| Quarterly Sales Results | @Mike Allen | 20 minutes |

Meeting Description
Review Sales Results for Prior Quarter

Action Items
Create an Action Item

| Owner | Due Date |
|---|---|
| Add an Owner | Add Due Date |

Notes
Add a Note

*PARTICIPANTS*

Organizer   Attendee   Attendees
Presenter              Presenters                +4

WEDNESDAY, JULY 23, 2025

10 AM

11 AM    Sales Analysis Review
         6 PARTICIPANTS

12 PM    Team Meeting

1 PM     Office Hours

2 PM

3 PM     Design Review

4 PM

Activity / Chat / Teams / Calendar / Calls / Files / Apps / Help

User adds new content, e.g., a video recording of a Sales Workshop

*FIG. 7A*

Sales Analysis Review

*DETAILS  CHAT  FILES  +*

PARTICIPANTS

Organizer / Presenter   Audience   All Audience   +4

CONF ROOM 2/3425

WEBINAR

ADDED — *QUARTERLY SALES*

ADDED — *WORKSHOP RECORDING*

WEDNESDAY, JULY 23, 2025

| | |
|---|---|
| 10 AM | Sales Analysis Review — 6 PARTICIPANTS |
| 11 AM | |
| 12 PM | Team Meeting |
| 1 PM | Office Hours |
| 2 PM | |
| 3 PM | Design Review |
| 4 PM | |

701

Agenda Topics

| | Owner | Duration |
|---|---|---|
| Introduction | @Jason Faulkner | 5 minutes |
| Overview and presentation | @Jason Faulkner | 25 minutes |
| Quarterly Sales Results | @Mike Allen | 20 minutes |

Meeting Description
Review Sales Results for Prior Quarter

Action Items
Create an Action Item

| Owner | Due Date |
|---|---|
| Add an Owner | Add Due Date |

Notes
Add a Note

Activity · Chat · Teams · Calendar · Calls · Files · ooo · Apps · Help

In response to the added content, the system changes the event type to a Webinar, which in turn changes roles and permissions

AUTOMATIC CONFIGURATION AND MANAGEMENT OF USER PERMISSIONS BASED ON ROLES AND USER ACTIVITY

BACKGROUND

Management of access permissions for large-scale systems can introduce a number of challenges both from an administrative perspective and a user perspective. For example, a system providing multi-user communication services, data storage services, and application services, can require a system administrator to coordinate permissions on a per service and per user basis. Such systems can require complex management paradigms to coordinate permissions at a granular level for each service. This requires administrators and users to gain an understanding of the capabilities of each service before permissions can be properly assigned. Some management tasks can become exponentially complex when administrators and users are required to coordinate permissions between the various services. Given such complexities, if a management paradigm is not executed correctly, an administrator or user may compromise the security of a system.

In an effort to simplify permission management tasks, some existing system designs provide fixed sets of access permissions for each service. Although this paradigm can simplify administrative tasks, this approach does not always accommodate the needs of each user scenario. For example, a set of access permissions for a group of users may be suitable for a team meeting, where each participant has equivalent access rights to shared files, meeting agendas, and other shared content. However, when a user wishes to setup another type of event, such as a broadcast, one user may wish to have more control over shared content, especially when a large audience is present. In order to change the access permissions for attendees, that user may have to contact an administrator to change access rights for different types of attendees, e.g., broadcast coordinators, presenters, and audience members. This leads to the inefficiencies and possible security issues given that such measures take a number of manual steps and different communication methods, e.g., emails, etc.

In addition, even with systems having fixed sets of access permissions, some existing systems may not provide a granular level of control over certain groups of users and certain sets of shared content. In addition, a system may not be able to provide a granular level of control over certain resources, e.g., available hardware, at desired times. Since manual user entries are often needed for such modifications, it may be difficult for an administrator to assign one set of access permissions for particular user during a small team meeting and then changed access permissions in timely manner if that user needs to quickly transition to another event, such as a live broadcast. In addition, some existing systems do not allow users to control permissions in a timely manner given that inefficiencies such as manual control, emails, and even phone calls to an administrator may be needed. Such issues can create security loopholes and unwanted exposure to a wide range malicious attack vectors.

In view of the foregoing, and other similar situations, can be appreciated that there is an ongoing need for improved management tools for access permissions for large-scale, multi-service systems.

SUMMARY

The techniques disclosed herein automatically configure and manage user permissions based on roles that are controlled by shared content and user activity. A system can analyze different types of input data, including event descriptions, event types, shared content, user groups, and user activity to determine one or more roles for individual participants. Each participant can be assigned a role, such as an organizer, producer, presenter, moderator, audience member, etc. Each role is used by a system to select and grant various levels of permissions for controlling access to system operations and resources. For example, permissions for system operations can control content sharing capabilities, administrative capabilities, notifications that are invoked by hand raising gestures, etc. Permissions for system resources can control access to stored content, hardware devices, etc. A system can provide dynamically adaptable levels of permissions that allow users to have granular levels of access to resources, such as read or write access to content, or predetermined functions of available software applications.

In some configurations, a system can provide automatic escalation and de-escalation of roles and corresponding permissions based on user activity. For example, a user may provide input data to create a communication session event. The input data can define an attendee list and an event type. An event type can characterize an event as a one-on-one meeting, company meeting, webinar, etc. The system can then determine an initial set of roles and permissions for each attendee based on the input data. A system can then monitor user activity to detect one or more activities that satisfy criteria defined in a system policy. When one or more activities satisfy a given set of criteria, the system can escalate or de-escalate the roles and permissions for specific attendees. For instance, when a user shares a new file of a particular file type, or a file having a predetermine set of content, the system may change the event type and roles and permissions of one or more participants to accommodate the new content. In another example, when a user modifies an agenda for an event or shares content that causes a system to modify an agenda, the system may change the event type and/or roles and permissions based on the modified agenda. In some instances, escalated roles and permissions can be implemented for a predetermined time period and such roles and permissions can be de-escalated after the time period. The system can recommend modifications to roles and/or permissions to a moderator for confirmation or the recommendations can be automatically implemented.

In some configurations, the system generates an agenda from input data to determine roles. The data can include, but is not limited to, shared content, user identities, data defining an event type, or any other content shared in any suitable format. For instance, shared content can include an image, video, or text that is displayed on a screen that is viewed by multiple users. Shared content can include files, messages, image data, text data, or content shared on a screen, such as a shared desktop. The roles are used to determine permissions, and the permissions control access to the shared content and other system operations.

By dynamically controlling granular levels of permissions in a timely manner based on the detection of specific activities, a system can improve the security of user data as well as improve the efficiency of collaborative systems. The system provides an increased level of security for data that is shared in a collaborative environment while also enabling a user to share information to specific sets of users for specific periods of time. For example, a slide deck can be used to determine durations of certain roles and permissions for specific individuals. Thus, temporary permissions can be automatically granted to allow users to share information to users according to the relevancy of shared content and a type of event used to share the content. The system can the remove the temporary permissions based on user activity related to the event or a duration determined by an analysis of the shared content. Such features can enhance the user experience while also improving the efficiency and the security of a system by dynamically reverting permissions back to their original settings in a timely manner. This prevents modified permission from existing for unnecessary periods of time, which may be a result of systems that require manual input of an administrator to control specific permissions.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1A illustrates a block diagram of a first state of a system for automatically configuring and managing user permissions.

FIG. 1C illustrates a block diagram of a third state of a system for automatically configuring and managing user permissions.

FIG. 2 illustrates examples of several event types, setup types, roles, and event stages.

FIG. 4A illustrates a user interface that may be used in a first stage of the process for automatically configuring and managing user permissions.

FIG. 4C illustrates a user interface that may be used in a third stage of the process for automatically configuring and managing user permissions.

FIG. 4D illustrates a user interface that may be used in a fourth stage of the process for automatically configuring and managing user permissions.

FIG. 5A illustrates a user interface that may be used in a first stage of the process for modifying user permissions through attributes of an agenda.

FIG. 5B illustrates a user interface that may be used in a second stage of the process for modifying user permissions through attributes of an agenda.

FIG. 6A illustrates a user interface that may be used in a first stage of the process for modifying user permissions through modifications to an associated document.

FIG. 6B illustrates a user interface that may be used in a second stage of the process for modifying user permissions through modifications to an associated document.

FIG. 6C illustrates a user interface that may be used in a third stage of the process for modifying user permissions through modifications to an associated document.

FIG. 7A illustrates a user interface that may be used in a first stage of the process for modifying user permissions through an addition of shared content.

FIG. 7B illustrates a user interface that may be used in a second stage of the process for modifying user permissions through an addition of shared content.

FIG. 8A illustrates a first user interface that may result from a process for modifying user permissions.

DETAILED DESCRIPTION

Figure 1B:
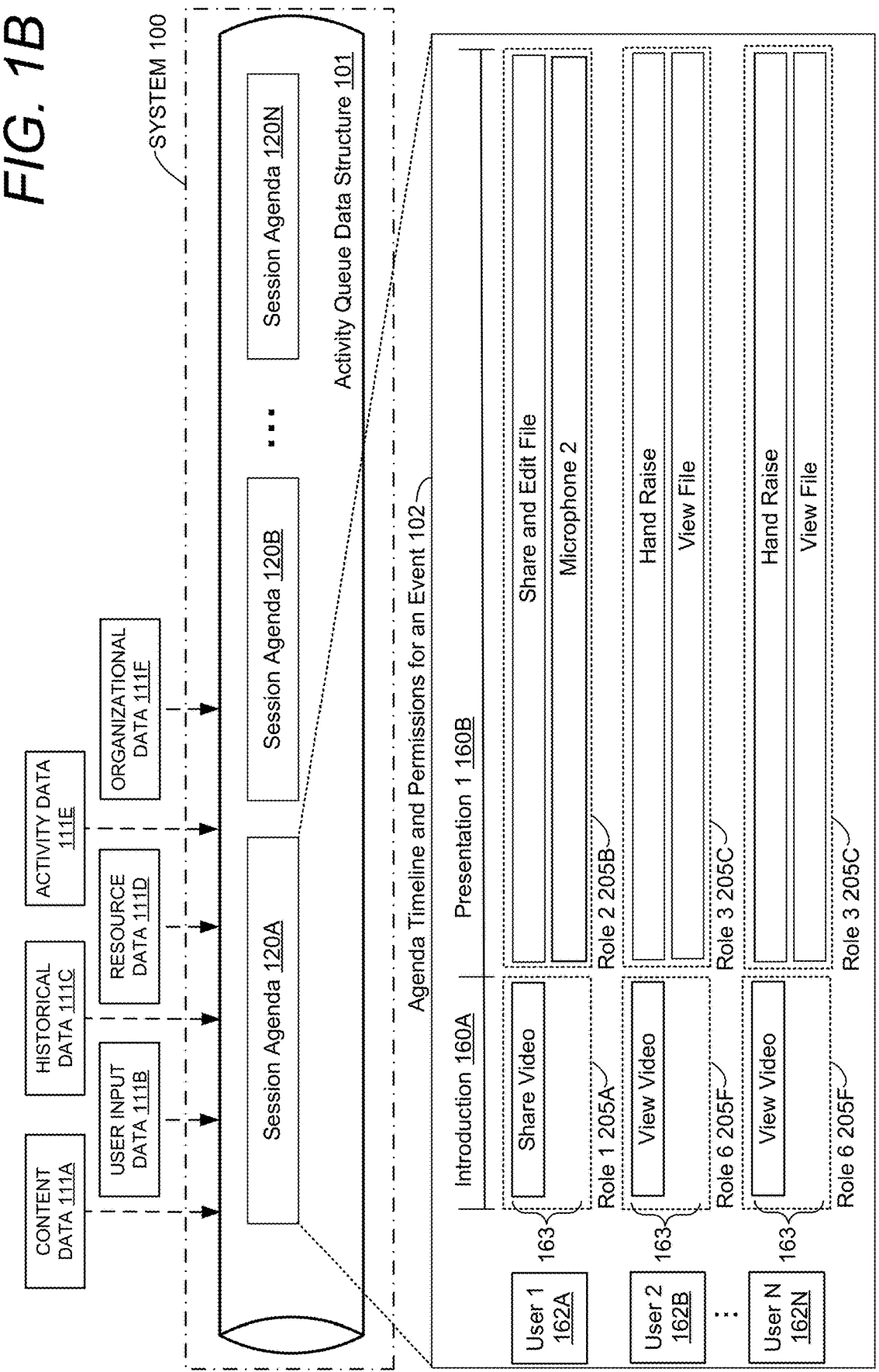
FIG. 1B illustrates a block diagram of a second state of a system for automatically configuring and managing user permissions.

FIGS. 1A-1C show a system 100 for configuring and managing roles 205 and permissions 163 for users 162 participating in an event 102 associated with a communication session. The system can analyze on various types of input data 111 to determine and modify roles 205 and permissions 163 for users 162. The input data 111 can include, but is not limited to, content data 111A, user input data 111B, historical data 111C, resource data 111D, activity data 111E, and organizational data 111F. In one illustrative example, an analysis of content data 111A, such as a slide deck, may indicate that the first user 162A is a presenter of a company meeting. The system can utilize any file type, such as a slide deck, for identifying a user and an associated role. In some configurations, a user's name indicated within a predetermined portion of the document, e.g., the first two slides of a deck, can indicate that a person is a presenter, etc. The system can also determine if a file specifies titles of roles for a person. In addition, the system can determine if a file specifies a type of event, e.g., whether an event is a corporate meeting, a school class, an all-hands company meeting, etc. Based on contextual data indicating a role and/or an event type, the system may assign a presenter role to an event participant, such as the first user 162A.

The system can then determine roles for other users 162, such as a second user 162B up to the Nth user 162N. The roles of the other users 162 can be based on an analysis of the content data 111A, historical data 111C, and/or other types of contextual data 111 including the first user's role. For example, if historical data and organizational data indicate that five users have met in the past with the first user as presenter and the remaining users as audience members, the system may determine that the remaining users, such as the second user 162B up to the Nth user 162N, have initial roles as audience members. Such a determination can also be made based on a type of event associated with any past events as well. For instance, if the system determines that the first user was a presenter in a threshold number of previous events having a specific event type, e.g., a company meeting, and other participants in those events were historically audience members, the system can determine that the roles of the other users 162 can be audience members.

The system can then assign permissions that are associated with the determined roles. For instance, the first user may be assigned a preset list of permissions that are associated with a presenter role, such as full control over microphones and speakers of a room, and control audio signals of remote computers and control over a display of content viewed on remote computers of audience members. The audience members may have permission to receive audio from the presenter and view content. The audience members may also be able to execute several system operations such as perform a virtual hand raise. When such functionality is available to a user, the system may detect a predetermined gesture from a person, e.g., a person raising their hand, using image data captured by a camera directed to the person. Such a gesture may be used by the system to generate activity data 111E. The system can then interpret the activity data to determine if a user has performed a predetermined gesture. In response to detecting that a person performed a predetermined gesture, the system may communicate a notification to other users requesting escalated permissions to contribute to a communication session, e.g., add to an audio signal and/or a video signal of a communication session. When permissions are not granted for a person to execute this functionality, the system does not generate the notification when the person performs the predetermined gesture.

FIG. 1A shows a first state of the system 100 in a process for automatically configuring and managing user permissions according to the scenario described above. In this example, in response to the analysis of a document identifying the first user as a presenter, the first user 162A is assigned a presenter role 205B "Role 2." This role can be associated with specific permissions 163 which grant the first user a level of control that allows access to a microphone "Microphone 2" and allows access to functionality that allows the first user to share and edit the document to other participants. The other users, second user 162B up to the Nth user 162N, are assigned an audience role 205C "Role 3." This role can be associated with specific permissions 163 that allow the other participants to view the shared document and also perform one or more functions, such as a hand raise function. The audience members can have a level of control that provide view-only functionality to the shared document.

This example is provided for illustrative purposes and is not to be construed as limiting. As described in more detail below, any combination of input data can be utilized to determine a role for any individual participant or a group of participants. Although this example illustrates one embodiment where a role for a first user is determined, the techniques disclosed herein can also determine a role for any number of users. For example, the input data can be analyzed to determine roles and permissions for all participants instead of determining roles and permissions for groups of participants. In addition, it can be appreciated that other permissions can be associated with particular roles. As described herein, the techniques disclosed herein can provide an association between a role and a predetermined level of control of certain resources. Thus, when a user is associated with particular role, they are given a set of permissions associated with that role. The system can change permissions that are associated with a particular role depending on various types of input data. As described below, for example, the system can escalate or de-escalate certain levels of control for people in an organization. In another example, the system can escalate or de-escalate certain levels of control for certain users based on a type of a file associated with a user, modifications to a file, modifications to an agenda, etc.

The system can also monitor user activity to determine if the input data 111 satisfies one or more criteria for initiating a role change of a participant. In response to determining that the input data indicates a need for a role change for one or more participants, the system can then change a person's role and thus also change permissions for that person. The permissions can be modified to vary a level of control, e.g., a level of access, a person has to system resources, e.g., hardware resources or content resources, or system operations, e.g., functions that allow users to communicate notifications and certain gestures.

In some configurations, the system can monitor the input data 111 and/or a data structure 101 defining user activity, also referred to herein as "queue data 101" or an "activity queue data structure 101." This data structure can define individual events 102 and each event can be associated with an agenda 120. It can be appreciated that the data structure 101 can store a number of agendas for different events to enable the system identify patterns of user activity over a number of events.

To illustrate features of how the system can monitor input data to implement role changes, in continuing the above-described example, consider a scenario where the first user 162A decides to share new content, such as a new video stream, prior to the event 102. The content can be shared after the initial roles of FIG. 1A are established. In response to receiving the new content, the system can modify the agenda 120 according to the new content. As shown in FIG. 1B, the agenda can be modified to include several sections to accommodate a new type of content. In this example, the shared new video stream is a different type of media than the slide deck, thus the system can generate a new section 160 to the agenda 120. The system can also determine an arrangement of the agenda based on the content. For example, if the system analyzes the new video stream and determines that the video stream is related to introductory content, e.g., keywords indicating fundamental concepts or introductory materials, as shown in FIG. 1B, the system can place the new section 160A before existing section(s) 160B.

In response to the modifications to the agenda, the system may also update roles for each individual or categories of individuals. Roles can be based on a file type and/or content within the file type. For instance, a video stream that is stored in a streaming service can grant a user with a presenter role having escalated or de-escalated permissions compared to a PowerPoint file. For example, to facilitate a broadcast of a shared video, the first user may be granted with a new role "Role 1" 205A that is associated with permissions for allowing a broadcast of the video stream to multiple users. The new role and corresponding permissions may be granted in addition to the permissions for sharing a file, e.g., the system escalates a person's existing permissions. Alternatively, the new role and corresponding permissions may be granted in lieu of the permissions for sharing a file, e.g., the system de-escalates some existing permissions.

In addition, the other users can be assigned different roles and/or permissions in response to the introduction of new content or a new type of content. For example, the second user through the Nth user may be assigned a new role "Role 6" 205F that is associated with permissions for allowing audience members to receive the video stream. The permissions associated with this new role for receiving a video stream can be different than other audience permissions for viewing file content. As shown in FIG. 1B, the roles during the video file viewing does not include hand raising or file viewing permissions during the introduction. These variations may be made to provide different environments. For instance, a presenter may not want audience members to have hand-raising functionality or an ability to view a file during a video viewing. This can help users focus on the immediate content, e.g., when a video is presented as a supplement to other content types.

Also shown in FIG. 1B, as the event progress through the agenda, the roles for each user can change according to the role assignments that are associated with each section. Each section duration can be based on a predetermined period of time or each section duration can be based on detected events, such as the conclusion of a shared video, etc. Thus, during the introduction, the first user has a first presenter role 205A then, the system detects the conclusion of the video playback and transitions to the second presenter role 205B. Similarly, the other users start with a first audience role 205F and transition to a second audience role 205C with a different set of permissions during the presentation in response to the system detects the conclusion of the video playback. The system may also analyze the content and determine a duration. For instance, if a video is 10 minutes long, the duration may be 10 and a half minutes. During the event, after the duration as lapsed the system transitions back to original roles, e.g., to the second presenter role 205B from role 205A or to the role 205C from role 205F. A quantity of content can also be used to determine a time duration, e.g., a number of words, a number of slides, number of pages, etc. can all be used to determine a duration for a set of temporary permissions.

Referring now to FIG. 1C, additional examples showing different types of input data for causing changes to an agenda, roles, and/or permissions are shown and described below. In one illustrative example, user input data 111B can cause a modification to shared content. The user input data 111B can include, but is not limited to, audio data received from a microphone associated with the user, command data received from an input device, e.g., a mouse, keyboard, touch service, or gesture data received from a camera or other imaging device. Any such input data 111B can be utilized to modify any shared content, an agenda, or other contextual data.

The system can analyze a modification to shared content and if a modification meets one or more criteria, the system can change one or more roles or permissions. For illustrative purposes, in continuing the above-described example, consider a scenario where a user modifies the slide deck associated with a presentation. In this example, input data indicates that the shared slide deck has been modified to name the second user 162B as a second presenter of a portion of the slides. In response to detecting that the content has been modified to name a second presenter, the system can update the agenda to create a second presentation section, e.g., "Presentation 2." In addition, the system can analyze the modification to determine the timing and duration of the new section. For instance, if the modification indicated that the second user 162B is to cover the first five slides of a slide deck and that the first user 162A is to present the second five slides of the slide deck, the system will arrange, e.g., coordinate the timing of, the presentations in the agenda to allow the second user to have a presenter role and corresponding permissions to present the content before the first user.

The system can also estimate a duration of a role, such as a duration of a presentation, based on an analysis of the content or the analysis of an agenda. The duration may be based on a number of words, pages, or sections of the content. The duration can also be based on historical data indicating a duration of a previous presentation made by the presenter. For instance, if the second user has had a threshold number of presentations having a rate of covering five slides in ten minutes, the system can allocate a duration based on that determined rate. The system can then determine a duration of a role and associated permissions based on the analysis of the content. Thus, the system may determine a duration for an agenda section and cause a system to automatically change roles and permissions when a system determines that a time duration for a particular section has run. The system can also base a duration on one or more actions. For instance, when the presenter stops sharing a view of the slide deck and after a number of slides have been shared, the system can then de-escalate from the temporary permissions.

As shown in FIG. 1C, in response to the analysis of the content, the presentation section is divided into a first presentation "Presentation 1" 160B and a second presentation "Presentation 2" 160C. Correspondingly, the first user is given an audience role, with an ability to view a file and to access hand raising functionality, during the first presentation and a presenter role, e.g., file sharing permissions, during the second presentation. The second user is given an audience role during the first presentation, with an ability to view a file and to access hand raising functionality, during the second presentation and given a presenter role, e.g., file sharing permissions, during the first presentation.

In some configurations, the system can also provide escalated permissions based on organizational data. For instance, if the second user is given a presenter role, and that second user has a threshold ranking within the company, e.g. is a CEO, the system can automatically give that person escalated rights, such as administrative rights, in addition to the presenter role and corresponding presenter permissions. This allows the system to leverage organizational data 111F, such as an organizational chart, to automatically grant higher levels of access to functionality and resources in addition to granting base role permissions based on shared content or a modified agenda. A threshold ranking can also allow a system to make exceptions to one or more policies. For instance, if a system policy limits the number of presenters, and shared content or another event, such a person joining an event, indicates a request to add another presenter beyond the limit of presenters, the system can make an exception to the limit for users having a threshold ranking within an organization and allow the new user to receive permissions that enables them to be a presenter despite a policy limit in the number of presenters. In some configurations, when the system makes an exception to exceed a limit of the number of users having a particular role, the system can also automatically de-escalate another user from a presenter role. For instance, in the above example, when the CEO joins a communication session having five presenters with a policy that limits the session to five presenters, and the communication session may allow the CEO to join as a presenter, and in addition, the system can de-escalate one of the other presenters to an audience role or another role with a lower level control of one or more resources and operations.

In another illustrative example shown in FIG. 1C, a modification to an event type can cause the system to change the agenda, roles, and/or permissions. An event type may be modified by the use of a number of different types of activities. For instance, an event may be initially categorized as a Team Meeting. However, based on a user input or based on a modification to shared content or the introduction of new content, the system may change the Team Meeting to a Q&A Session. Where a system policy may define a Team Meeting as an event type that is associated with a first set of roles and permissions, and the policy may define a Q&A Session as an event type that is associated with a second set of roles and permissions The user input to change the event type may be a manual input specifically selecting an event type. In another example, the detection of a file indicating several sections that align with a particular event type may also cause a system to select a specific event type. This may occur for instance if a slide deck has a presentation section and slides indicating a conclusion and a Q&A session. This detection process may be achieved by keyword matching techniques. In one illustrative example, the system may select a particular event type if the event type has a threshold number of matching sections to an outline indicated in a shared file. Thus, in this example, if the shared file listed an introduction, at least one presentation, a conclusion, and a Q&A session, and the system defined a policy having a threshold of three matching sections, system a select a Q&A event type. In response to a detection of such an input or a file indicating a predetermined event agenda, the system may create several agenda sections such as the Conclusion section 160D in the Q&A Section 160E.

An event that is categorized as a Q&A session event type may have a resulting agenda shown in FIG. 1C. This agenda comprises an introduction, one or more presentation sections, a conclusion, and a Q&A section. Each section may have a predetermined set of roles for each user. For example, a presenter may have the ability to share files and access to specific microphones, such as the fourth role "Role 4" 205D, during a conclusion. The presenter may also have the ability to edit specific notes within a file and have access to specific microphones such as the fifth role "Role 5" 205E, during Q&A session. Each event type may have different sets of permissions for individual roles. For instance, audience members may have escalated permissions for providing audio data and the ability to contribute to a meeting vocally for a team meeting but audience members may be restricted to view only permissions for larger event types such as a company meeting or a broadcast having a threshold number of participants.

In some configurations, resource data 111D can identify available hardware and software resources that can cause a system to select, modify, or activate a role or one or more permissions. In such embodiments, the system may receive resource data 111D defining available hardware resources and software resources. The resource data 111D can also identify capabilities of hardware resources and software resources, e.g., camera resolution, a video frame rate, a sensitivity level of a camera or microphone, or a location of each camera or microphone. Based on the availability and location of each microphone and/or individual capabilities of each hardware resource and each software resource, the system may select individual permissions for a particular event type or a particular agenda. In one illustrative example, an event may be associated with a specific room having a particular setup, also referred to herein as a "setup type." Data defining a setup type can describe attributes of available microphones. The attributes can include locations of microphones, performance specifications, directional properties, etc. For instance, a particular room may have a microphone at a podium directed to a presenter chair and other microphones in an audience seating area directed toward the seats. Based on resource data indicating this type of setup in addition to a selection of a particular event type, the system may activate certain microphones for different people based on the roles. For instance, for a team meeting, e.g., a meeting having less than the threshold number of participants, the presenter may have access to the microphone at the podium and audience members may have access to the other microphones the audience seating area. However, for a large meeting, e.g., a meeting having greater than the threshold number of participants, the presenter may have access to the microphone at the podium and audience members may not have access to the other microphones the audience seating area.

As summarized above, one or more roles and permissions can be determined based on an event type and/or a setup type. FIG. 2 illustrates some examples of event types 201 and setup types 203. In general, an event type 201 can define a format and other attributes of an event. Individual event types can be associated with individual sets of roles, permissions, UI layouts, and/or particular agenda outlines. For example, if a system determines that an event is a "one-on-one" event type, the system can limit the number of participants to two users and give each participant equal permissions with respect to a level of control over resources and operations. In such an example, the UI layouts can be limited to screen sharing and/or split screen formats that allow each person to operate one camera and see a display showing a self-view and a view of the remote user. Each event type, such as the one-on-one event type, may also define exceptions. For instance, the system may give each participant equal permissions unless one of the participants has a ranking that is above a threshold ranking within an organization, e.g., a CEO or executive or system administrator or an event organizer. In such instances, the participant exceeding the ranking threshold may have escalated levels of control, e.g., administrative rights and/or abilities to modify the rights of the participants, that can exceed any limit on permissions that is associated with an event type or role.

In other examples, an event that is categorized as a Status Check-In event may limit the number of participants to a predetermined number and give at least one user administrative rights. In a working session, each participant may be granted automatic rights for a multiuser editing session where individuals below a threshold ranking level are only allowed to make edits using a redline format. In yet another example, the Tech Help event may give a person having a particular title within a company, or certain credentials, permissions to view remote desktops of other users and also have the ability to control user input devices to control the remote desktop sessions. In other examples, event types ranging from a Review Meeting up to a Company Meeting, various levels of control for operations and access to data may be reduced for audience members while control over resources, such as microphones and stored content, maybe escalated for administrators and presenters.

Data defining the setup types 203 can define available resources for various rooms or other locations. For instance, if an event is associated with a particular room in a building, the data defining a setup type for that room may include the capabilities of the microphones in the room, the capabilities of cameras within the room, etc. Other attributes such as a maximum capacity of participants, the availability and capabilities of display screens may also be stored within the data defining a setup type. The setup type may also define properties of computing devices. For instance, if a user creates an event that associates a presenter with a mixed reality (MR) or virtual reality (VR) headset, the data defining the setup type may define the device's capacity and specifications for broadcasting video signals, e.g., max and min resolution, etc. Data defining such capabilities and availability of different devices and locations can be utilized by the system to determine roles and permissions. For instance, if a user establishes an event as a tech help meeting, and the administrator is using a VR headset, such an arrangement may allow the system to escalate the administrators level of control to resources or operations to allow the administrator to carry out tasks using the virtual reality environment.

Also shown in FIG. 2, various examples of different roles 205 are shown. As described herein, the system can determine a role for visual based on input data 111 satisfying one or more criteria. For example, a particular event type and/or a setup type can be associated with one or more roles. Thus, if the system detects an event having a particular combination of an event type and/or a setup type, the system may automatically select a predetermined set of associated roles. For instance, a one-on-one meeting that is scheduled to meet within a conference room, maybe associated with a set of roles that consists of attendees having equal levels of access to resources and operations. In another example, a company meeting that is scheduled in an auditorium may be associated with the combination of roles including organizer, a producer, one or more presenters, multiple moderators, and viewers, e.g., audience members. This allows a system to readily determine a set of associated permissions that are appropriate for invocation, the available hardware, and the context of the meeting. In addition, FIG. 2 also shows several advanced stages, also referred to herein as agenda sections. Once the roles of an event are determined, the system can also associate specified sets of permissions with different stages of an event. For instance, an audience member may have permissions to share comments and contribute to an audio signal of a communication session in a pre-event section, but then have view-only permissions during a presentation. The audience member can also have escalated rights for sharing files and permissions for contributing to an audio signal at a post event, e.g., a predetermined period of time after a presentation. Alternatively, or in addition, a specified set of permissions for a role, such as an audience member, can be ongoing. In such scenarios, once a user is deemed as an audience member of an event, they may have perpetual read and/or write permissions to a file or resources.

Figure 3:
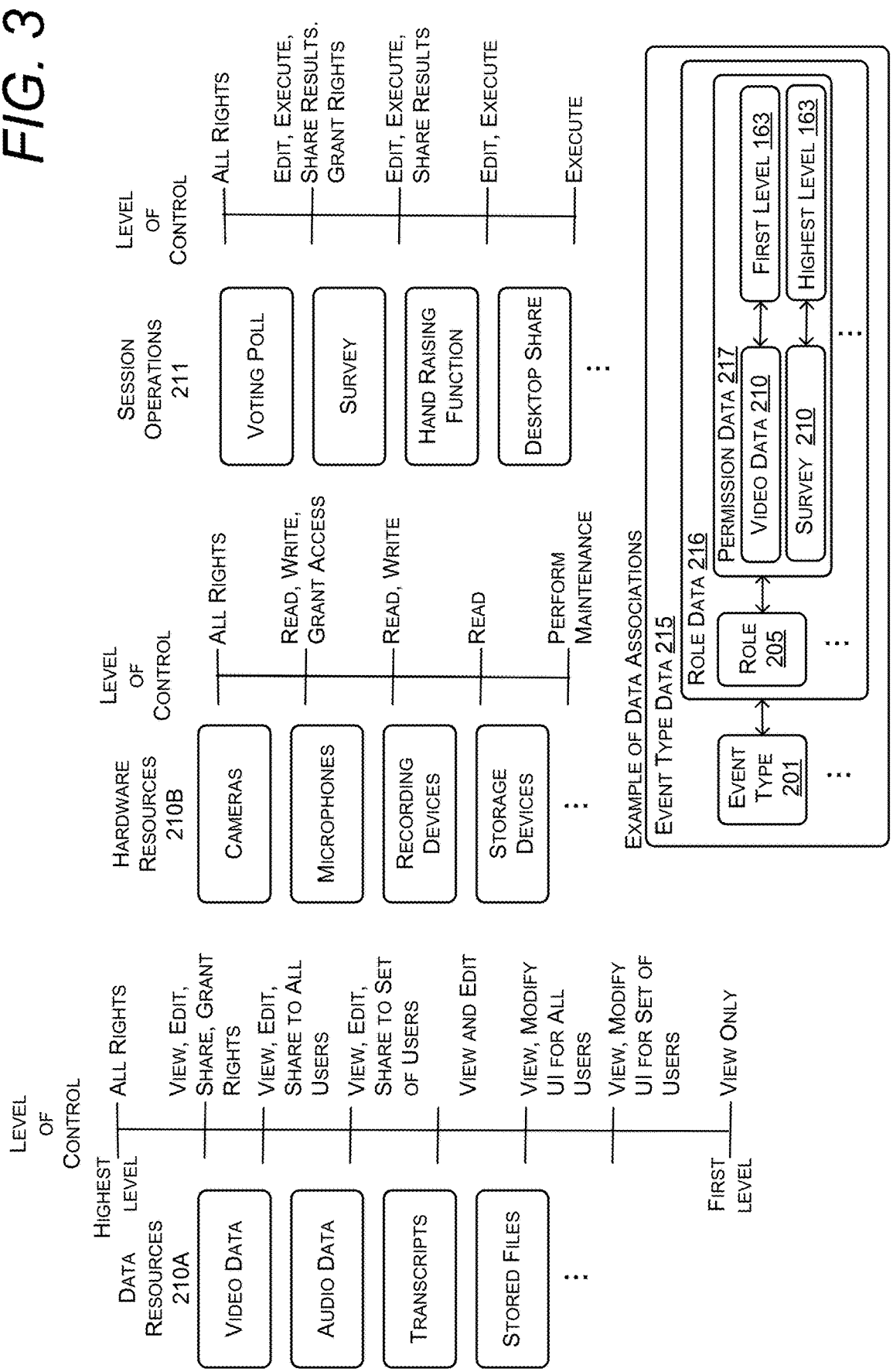
FIG. 3 illustrates examples of several resources and session operations and corresponding levels of control.

FIG. 3 illustrates examples of permission levels that may be used to control various resources and operations. For instance, a data resource 210A, which can include video data, audio data, transcripts, or stored files, can be associated with different levels of control that can be at an administrator level, e.g., all rights, or at a spectator level, e.g., view-only rights. In another example, hardware resources 210B, which can include cameras, microphones, recording devices, storage devices, can be associated with different levels of control. Higher levels of control can include comprehensive administrative permissions, e.g., all rights including rights to change permissions for other users, or lower levels of control that can include read and write permissions or just read-only rights. Higher levels of control can also include the ability to control access rights to a particular hardware resource for other users, e.g., an admin user can control cameras, microphones, speakers and UI layouts for other users. Lower levels of control can allow read-only access or maintenance access levels that allow users to power up devices, etc. Session operations 211 can also be associated with specific levels of control, e.g., administrative rights, execution rights, sharing rights, etc. Several examples of session operations can include voting polls, surveys, hand-raising functions, desktop sharing, etc. Voting polls can allow users to send a question to participants of an event. A voting poll can be configured to present questions to various participants and receive votes from those participants. Different levels of access to the voting results can be granted when an associated role is granted to a user. For instance, a higher level of control may allow a user to create a voting poll, send the voting poll, view the results of each person who voted, and provide annotations to voting results, while lower levels of control may only be able to see percentages of the results.

FIG. 3 also illustrates an example of a data structure, e.g., event type data 215, showing an association between an event type 201, a role 205 and various levels of permissions. Such data structures may be utilized by the techniques disclosed herein such that when an event type is selected for an event and a particular role is selected for a user, the system can refer to the data structure to determine various permissions 163 for resources 210 and operations 211 and their associated levels of control. In this example, permission data 217 can associate various resources and operations with levels of control, role data to 16 can associate a role with a particular set of permissions defining levels of control. In addition, event type data 215 can associate an event type 201 with a particular set of roles and corresponding permissions.

In one illustrative example, the system can analyze any shared content to determine an associated privacy level. For example, if a user is sharing a video stream with a number of users, the system may analyze the shared video stream to determine the presence of sensitive information. The system may utilize predetermined keywords or predetermined patterns or shapes to identify sensitive information. The sensitive information can be redacted from the video stream. In one illustrative example, when a user shares a video stream of their office with a whiteboard behind a user showing sensitive information, the system can redact the sensitive information from the video stream. In some configurations, the system can provide a notification to the user that sensitive information has been detected in the video stream. The user can provide a response to the notification causing the system to redact the sensitive information from the video stream.

FIGS. 4A-4D illustrate a set of user interface arrangements that may be utilized in conjunction with the techniques disclosed herein. These figures illustrate the scenario where an event is created by user. The system then generates an agenda and recommends content based on an initial set of input data provided to create the event. As adjustments are made to the content, this example illustrates how roles and permissions can be modified how that information can be displayed to the user.

With reference to FIG. 4A, consider a scenario where an event organizer provides input data defining initial attributes of an event. For instance, the organizer may provide an input that indicates a list of participants, a location of the event, and an event type. In response to the input, the system can analyze the input data and other contextual data to suggest agenda outline and one or more attachments. As described herein, based on historical data and/or other contextual data, the system may determine that a set of users have met in past events. In response to determining that at least a threshold number of users of a predetermined set of users have met in the past, the system may suggest one or more content items for this event. The content items can include documents that were shared in the past events or other documents that were created in association to the past events. In addition, based on historical data, system may also recommend an agenda or agenda items that were used in previous events. The selected files can be displayed as suggestions or recommended content along with a display of other determined attributes.

Alternatively, or in addition to utilizing historical data, the system may analyze the event type, and based on the event type determine the particular agenda and suggested items. In this example, the agenda items include an outline comprising of an introduction, a presentation and a results section. In addition, other attributes such as a meeting description may be recommended. The meeting description and other recommended attributes can be derived from content that is discovered by the system. For instance, based on the list of participants, the event type, and/or a date of the event, e.g., near the end of a quarter, the system can determined that the meeting is regarding sales results. In response, the system can select files containing sales results that are owned by each participant and extract and utilize such information to generate event attributes such as event descriptions, agenda items, durations of each agenda item, etc.

Figure 4B:
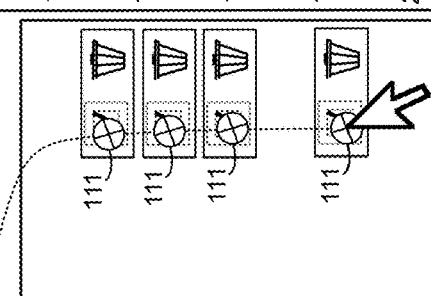
FIG. 4B illustrates a user interface that may be used in a second stage of the process for automatically configuring and managing user permissions.

As shown in FIG. 4B, in response to the recommendations, the system can receive a confirmation input 111 for individual recommendations. In some configurations, the confirmation can include a user input, such as a mouse input, a touch screen input, or a voice command. Also, in some configurations, the system may confirm a recommendation, e.g., a suggestion of an attribute, if no user input is provided after a predetermined period of time. Alternatively, a system can receive input data, such as a user input, that rejects a recommendation. In response to a rejection of a recommendation of an event attribute, that system can remove an agenda item or a suggested attachment. For illustrative purposes, in the example shown in FIG. 4B, the system receives a user input that confirms that recommendations for the agenda items as well as the second recommended document, which is a word processing file. The user input does not confirm that first recommended document, which causes the system to withhold any changes to a role or permissions that are indicated in the contents of the first recommended document.

In response to receiving a confirmation of the agenda items, the system can then allocate roles and corresponding permissions to each user. In this example, it is given that the user providing the initial input data to create the event is also the owner of the presentation content. Thus, in response to the system detecting that the content identifies the event organizer as the owner of the shared content, the system determines that the user as an organizer and presenter. Presenter rights are also granted as a result of the assignment of the role. Also, response to this confirmation input, other named participants can be given a role as an attendee, as shown in FIG. 4B.

In response to receiving a confirmation of an attachment, the system can analyze the attachment to identify additional input data that may cause the system to modify the agenda and/or any corresponding roles. For illustrative purposes, in this example, in response to the acceptance of the quarterly sales spreadsheet, the system determines that the spreadsheet indicates more specific results, such as "Quarterly Sales Results." In addition, the system identifies a person as an owner of that data, e.g., Serin Smith. In response to these findings, the system then makes another recommendation to change the agenda item from "Results" to "Quarterly Sales Results." In addition, the system also changes the owner of that section of the presentation. In this case, the owner of that section of the agenda is changed from Jason to Serin. The system can then display a confirmation UI element, e.g. a checkbox that allows a confirmation or another representation that indicates rejection of the recommendation. For illustrative purposes, as shown in FIG. 4D, a user input 111 indicates a selection and confirmation of suggestion to change the agenda item. In response to receiving the confirmation of the modified agenda item, the system can then modify the rules and corresponding permissions for particular user. In this instance, given that the user Serin Smith was confirmed as an owner of presentation materials, the system can also deem that user as a presenter. Thus, the system can also provide corresponding levels of control that the user may need for performing an assigned role. For instance, Serin's permissions to write to a file may be escalated from a read-only status during the 15-minute duration that is allocated to her presentation slot. Also shown in FIG. 4D, other suggested content that is not confirmed by user is not analyzed for the purposes of modifying an agenda and/or associated roles. The recommended file can remain as a suggested attachment until either confirm or denied by a user having suitable credentials. In some configurations, recommended files that are not confirmed are not utilized by the system to influence modifications to an agenda, roles, and/or permissions.

FIGS. 5A-5B illustrate a set of user interface arrangements that may be utilized in conjunction with the techniques disclosed herein. These figures illustrate the scenario where established roles and permissions are modified based on modifications to an agenda. In this example, a user makes an adjustment to an agenda item by modifying a duration associated with the agenda item. In response to the modification to the agenda item, the system modifies parameters of an existing set of permissions that are associated with an assigned role.

In the example of FIGS. 5A-5B, consider a scenario where an event organizer modifies an agenda item. In this illustrative example, the event organizer modifies the duration of a presentation section from 15 minutes to 20 minutes. In response to such modifications, the system can extend the duration associated with the permissions granted to users during that time. In the specific example, the presenter, Serin, is allocated presenter role and the corresponding permissions for a longer period of time. In addition, other participants that are deemed as attendees including the other presenter, may maintain more restricted audience permissions, view-only permissions, such for a longer period of time. The system can also alter the permissions of other users to allocate time for extended durations, such as the extended duration of Serin's permissions. In this example, FIG. 5B shows that the duration associated with Jason's presentation has been reduced from 25 minutes to 20 minutes. This modification to the second user's role, Jason's role, can be in response to this is determining that the modification to the content indicated a need to change a duration of a first user's role, Serin's role, and in response to determining that extending the duration of the first user's role would cause the meeting to extend a limit. This example shows that a modification to a role can be in response to the detection of role modification.

In addition, the system can also provide notifications to users regarding a change to their roles. In the example described above, the second user, Jason, can be notified before and during the event that the duration of his permissions have changed. This modification can also be displayed in the agenda. In some configurations, the system may modify the duration in response to a user confirmation. For instance, the example shown in FIG. 5B, the system may provide a notification to Jason regarding the duration modification, and the system may only change the permissions response to receiving the confirmation input from Jason.

Figure 6A:
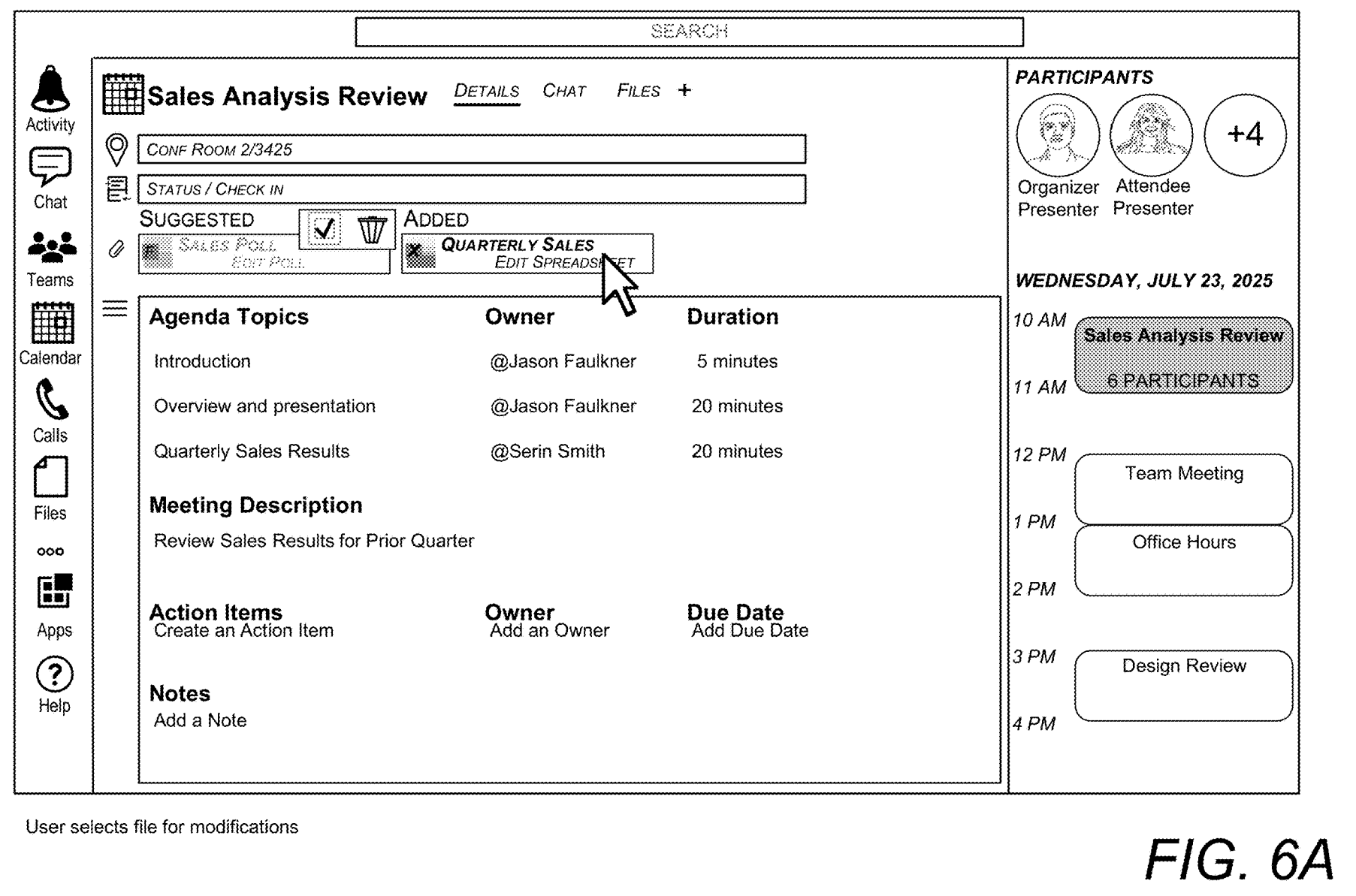
Figure 6B:
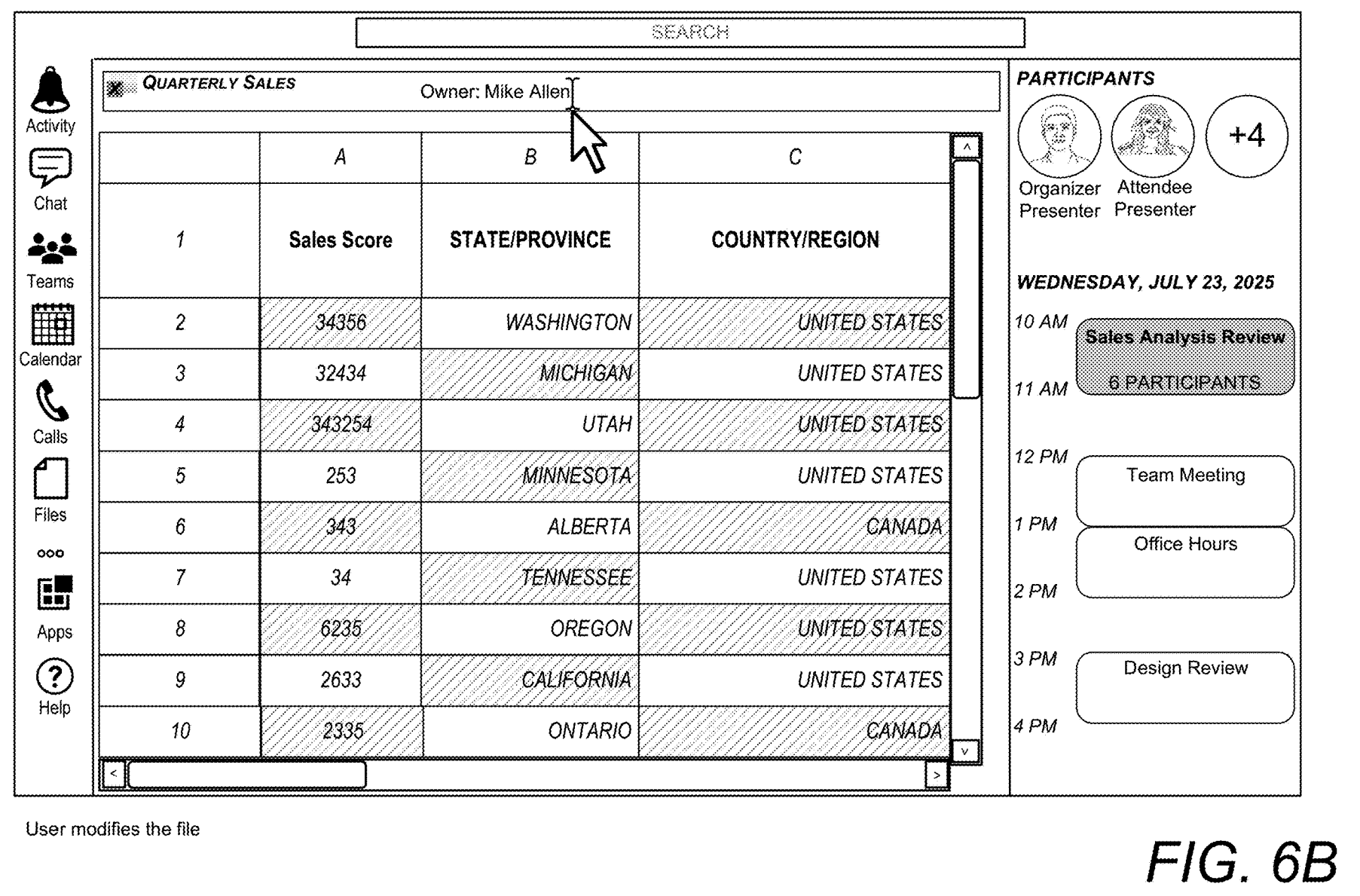

FIGS. 6A-6C illustrate a set of user interface arrangements that may be utilized in conjunction with the techniques disclosed herein. These figures illustrate the scenario where established roles and permissions are modified based on modifications to shared content, such as an attached file. In this example, a user makes a modification to an attached file. In response to the modification to the file, the system modifies parameters of the agenda and an existing set of permissions that are associated with a given role.

In this illustrative example, as shown in FIG. 6A, a user with suitable credentials selects a file for editing. In response to the selection, as shown in FIG. 6B, the application can transition the user interface to an editing tool UI for that particular user. The content, such as the spreadsheet cell data, or any other attributes, such as the file owner or content owner, can be modified within the user interface. In this particular example, the user changes the ownership of the file from Serin to Mike. Once the modifications are saved, as shown in FIG. 6C, the system can modify the agenda reflecting the modifications to the content or the file attributes. In this case, the agenda reflects the new owner of the associated agenda item. In response to this update, the system can automatically modify the roles and corresponding permissions that are assigned to users associated with the modified agenda item. In some embodiments, the system may also update roles and corresponding permissions in response to modifications to content that may not require an update to the agenda. In addition, the system can replace Serin's presenter role with an audience role. The system would then update Serin's permissions to reflect the new role, e.g., change Serin's level of control to a view-only participant. This de-escalation can occur as a default action when the system detects a loss of a task related to a file, such as a modification to a file that removes the name of a presenter.

In some configurations, instead of automatically modify the roles and corresponding permissions, the system may generate a notification to each user describing the nature of the modification. For example, an example of FIG. 6C, the system may provide a notification to Serin or Mike indicating the ownership change. The system can modify the ownership attributes in response to at least one of the users providing a confirmation input.

In another example, the system can replace Serin's presenter role with a moderator role. The system would then update Serin's permissions to reflect the new role, e.g., change Serin's level of control to a participant that controls volumes of audience members and presenters. This escalation can occur when the system detects a loss of a task and/or detects the presence of input data that indicates a new task. For instance, the system can determine that Serin was a previous owner of the shared content for multiple files. When the system detects that a person has had previous ownership of, or has contributed to, a threshold number of files, the system may escalate their level control over activity related to those files.

FIGS. 7A-7B illustrate a set of user interface arrangements that may be utilized in conjunction with the techniques disclosed herein. These figures illustrate the scenario where established roles and permissions are modified based on modifications to an event type. In this example, a user makes a modification to the event type of the meeting. In response to the modification to the event type, the system modifies parameters of the agenda and an existing set of permissions that are associated with a given role.

The event type can be changed using a number of different types of input data. For instance, a user can provide an input indicating an event type. In another example, a user can provide content that indicates a need to change either a forum, e.g., a room, or change the event type. In the illustrative example shown in FIG. 7A, a user with suitable credentials shares a recorded video and audio session, the "Workshop Recording." In response to receiving this attachment, the system can analyze the contents and other attributes of the attachment to determine the outline associated with the content. If the outline and/or other attributes of the shared content satisfies one or more criteria, the system can select a new event type. In one illustrative example, if a recorded video comprises a number of keywords, such as webinar, classroom, or otherwise describes grade levels, the system can select an event type to match those keywords. The outline of the content can also be utilized as a factor. For example, a recording of a presentation that also provides interactive functionality, such as voting polls and questionnaires, can provide an indication that a webinar is a suitable event type.

In this particular example, the shared recording comprises an outline and/or other attributes, such as keywords, that causes the system to change the event type to a webinar. Given this set of example parameters, as shown in FIG. 7B, the system modifies the event type displayed in the user interface. This modification can also be displayed with a verification user interface element 701. In response to the system selecting the new event type, or in response to a user confirmation of the user interface element 701, the system to change roles and/or permissions to accommodate the new event type. For illustrative purposes, it is a given that a webinar is associated with a limited number of presenters and a number of audience roles. Thus, if the event had a number of presenters that exceeded the limit that is applied to presenter roles for a webinar, the system can automatically de-escalate a number of select presenters to audience members. As indicated in the example of FIG. 7B, the system maintains one person as a presenter and changes other presenter roles to audience members.

Figure 8A:
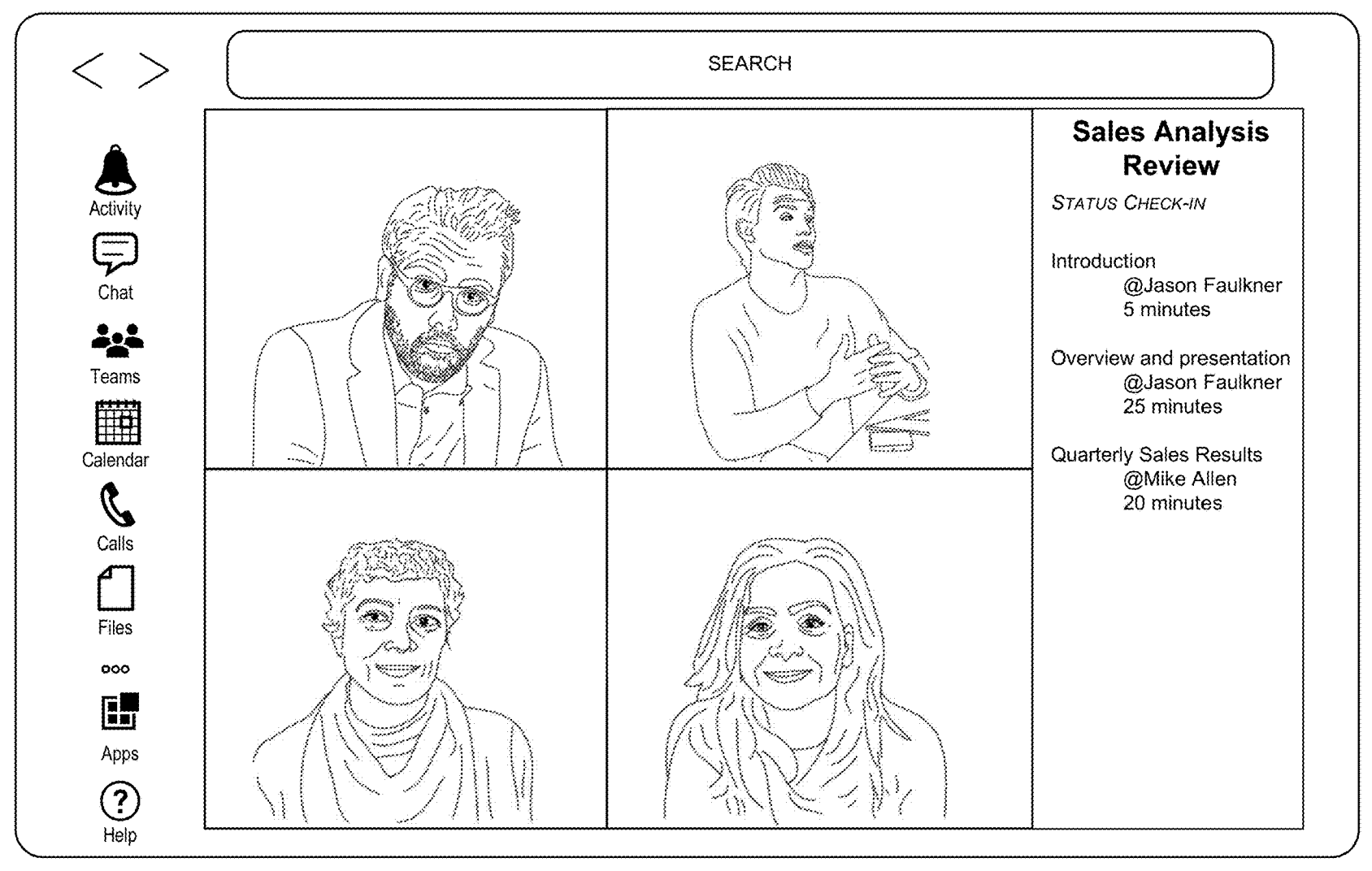
Figure 8B:
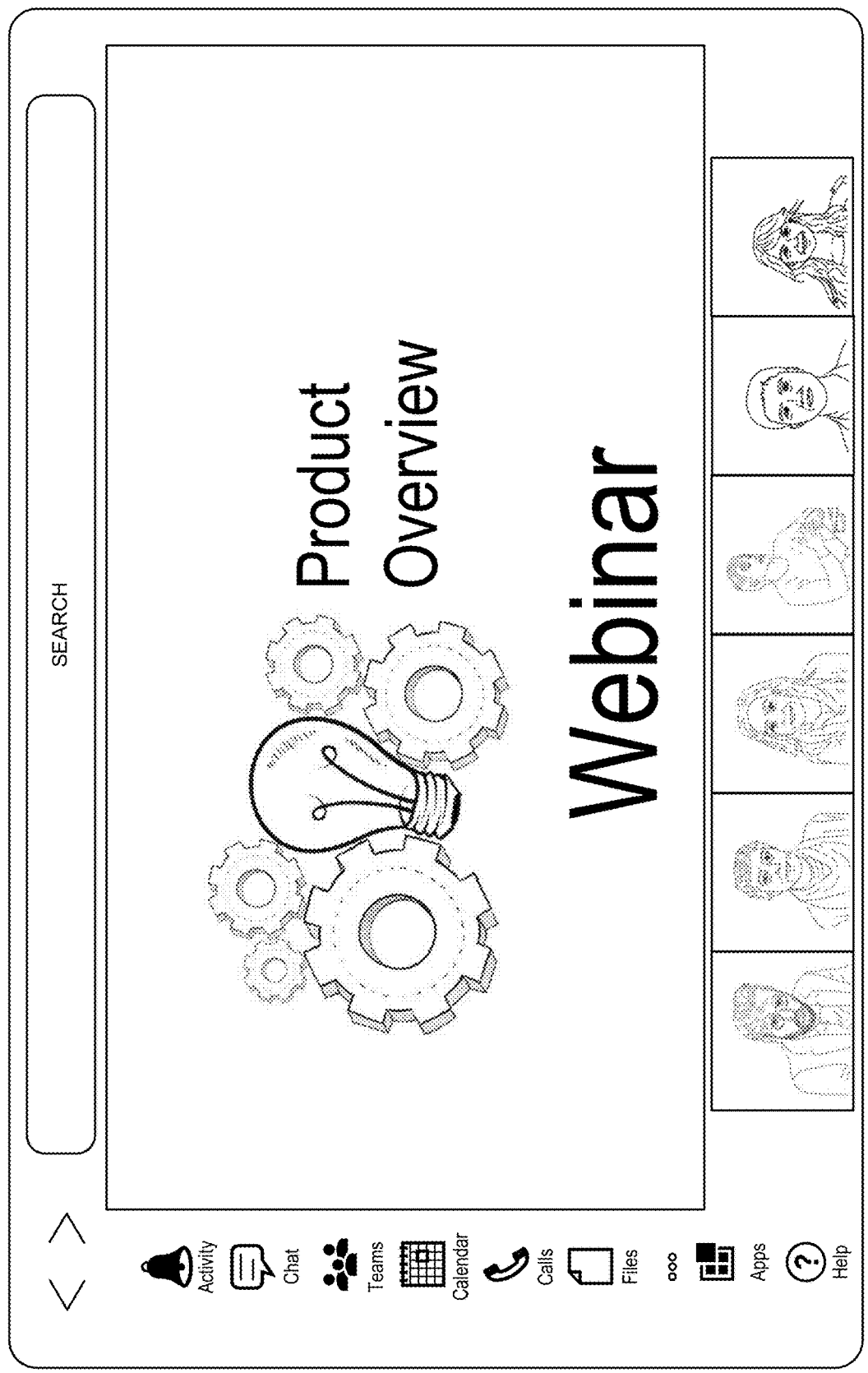
FIG. 8B illustrates a second user interface that may result from a process for modifying user permissions.

Each event type can also be associated with a particular user interface arrangement. Thus, system changes an event type, the system can also change a user interface arrangement for each participant. FIGS. 8A-8B illustrate one example of this transition. As shown in FIG. 8A, when the event is categorized as a Status/Check In meeting, the system causes computing devices of each participant to have a first user interface arrangement. As shown in FIG. 8B, in response to determining that the event type has changed from a Status/Check In meeting to a Webinar, the system causes computing devices of each participant to have a second user interface arrangement, e.g., the UI arrangement shown in FIG. 8B. Each user interface arrangement may be configured to emphasize users having certain roles or emphasize the presence of content while equalizing the prominence of individual participants, as shown in the example of FIG. 8B. In some configurations, a size of a rendering of a person can be an indicator of a level of control over a resource or function. Thus, higher level permissions, such as a presenter vs a spectator, can cause a system to increase the size of a rendering of a presenter relative to the spectators.

Figure 9:
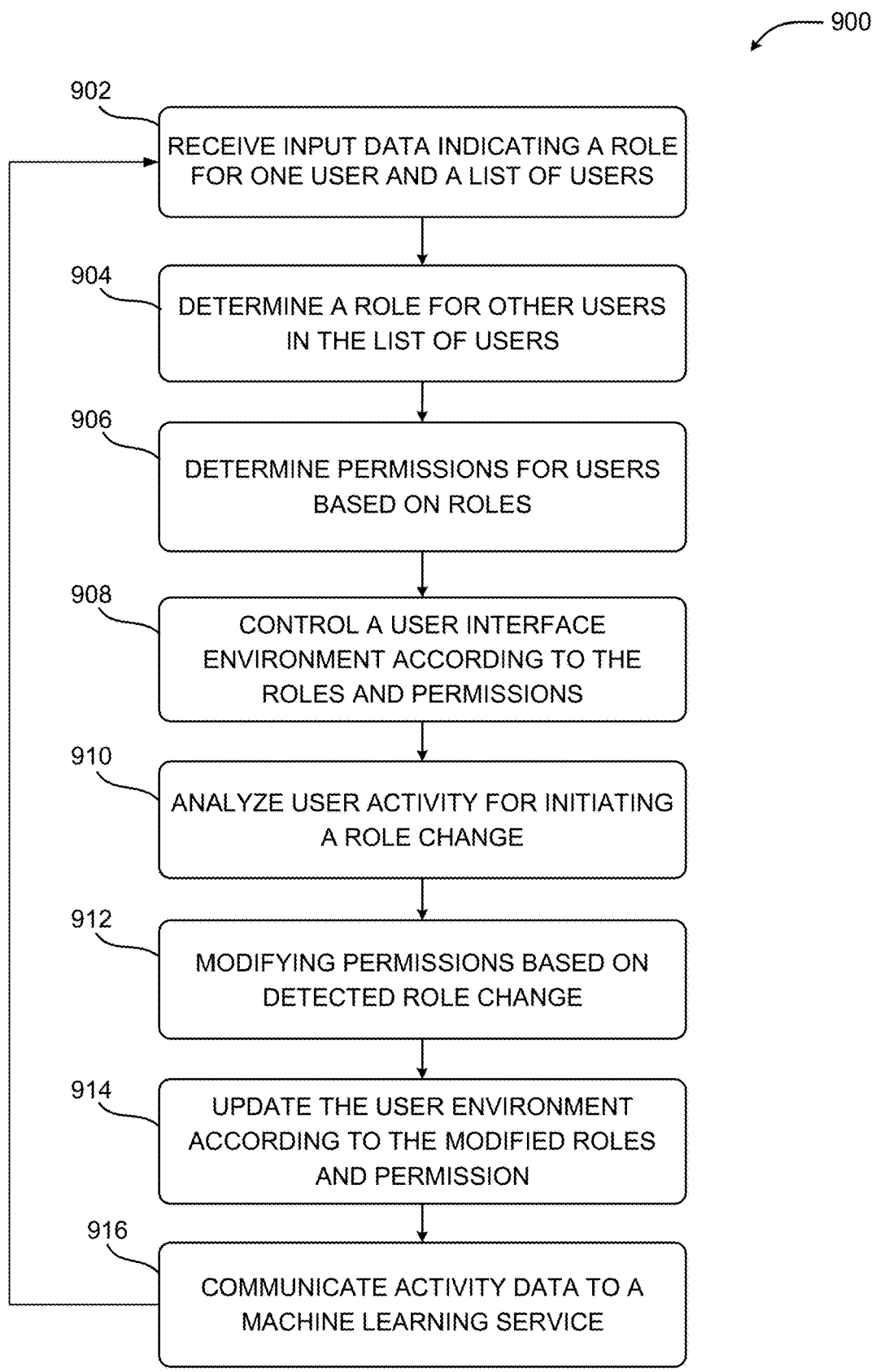
FIG. 9 is a flow diagram illustrating aspects of a sample routine for implementing the techniques disclosed herein.

FIG. 9 is a diagram illustrating aspects of a routine 900 for computationally efficient management of the techniques disclosed herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 9 and the other FIGURES can be implemented in association with the example presentation user interface(s) (UI) described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

The routine 900 starts at operation 902 where the system receives input data 111 indicating a role 161A for at least one user 162A of a plurality of users 162 of a communication session 1104. For example, the roles for a first set of users can be indicated by an organizer, e.g., during a meeting setup a user input specifies a first user a Presenter. In another example, the system can analyze content to determine a role of the user. The system can analyze documents for keywords such as presenter or identify an owner of a document and deem that owner or author as a presenter if the document fits a particular format. For instance, a person named within a PowerPoint presentation can be assigned a presenter role. However, if the document is the second type, such as a word document describing questions and answers, the system can assign the document owner or author a moderator role. The roles for a first set of users can be indicated by a specific grouping of people as well. For instance, if a group of five people have been working in the past in a threshold number of events and a particular person of the group has a presenter role a threshold number of times, that particular person is assigned a presenter role.

In some configurations, the system can receive input data 111 indicating an event type 201 of an event hosted on a communication session 1104. For example, an event type can be indicated by an organizer during a meeting setup specifying a session as a One-on-One session, a company meeting, etc. In another example, an event type can be indicated by an analysis of content, e.g., deck indicates a meeting type. In yet another example, an event type can be indicated by a specific grouping of people and/or other contextual data such as levels in a company. For example, if a group of five people have been working in the past in a threshold number of events having a specific event type, the system may select that even type for the current event. The event type may also be indicated in a user input describing an event. Thus, if a user enters a text description or a title of a meeting, such information can be analyzed to determine an event type. For instance, keywords or a contextual analysis of a title, such as "manager meeting" may indicate a One-on-One event type. In addition, a description in conjunction with a number of invited participants can indicate an event type. For instance, keywords or a contextual analysis of a title, such as "manager meeting" may indicate a One-on-One event if only two people are invited. However, an event title of "manager meeting" may indicate a team status meeting if three or more people are invited.

The analysis performed in operation 902 can produce an output in the form of a data structure defining an agenda. The agenda can have sections that are generated in response to a detection of a topic or a particular activity, such as an introduction, presentation, and a conclusion or summary, or a question and answer period. Such agendas can be generated using the interpretation of the input data, as described herein. Thus, past meetings having a particular meeting format can be used to generate an agenda, an outline of a document can be used to generate an agenda, etc. Roles can be determined for each person by an interpretation of any type of input, and each role can be associated with a person and each role can be associated with a section of an agenda. Thus, as an event transitions through an agenda, the roles of each person can change, causing permissions to change for each person as their roles change.

At operation 904, the system can determine one or more roles for a second set of users of the plurality of users other than the user(s) that are assigned roles in operation 902. Roles for the second set of users can be based on at least one of (1) an analysis of shared content 111A or (2) an analysis of historical data 111C identifying previous roles of the individual users 162B. For example, if the system determines that a particular set of users has met a threshold number of times in the past, the system may analyze roles of each person in such events. If each person has participated in a particular role in past events, those roles are granted to the users in the current event. For example, if a CEO of a company and five managers had a history of meeting with a group of 20 employees a threshold number of times, and in those events the CEO was granted a presenter role, the managers were granted moderator roles and the employees were granted audience roles, operation 904 can cause the system to adopt at least a portion of those roles for a current event.

In some configurations, roles of individuals can be based on an event type. For example, if an event type is a status meeting, each person may be assigned the same role, such as a presenter role. In another example, if an event type is a status meeting having less than a threshold number of people, each person may be assigned the same role, such as a presenter role. However, if an event type is a status meeting having greater than a threshold number of people, the system may determine the meeting is a town hall meeting or a company meeting depending on the threshold, and each person may be an attendee with limited ability to contribute audio and content data, and one person having a threshold level within an organization may be designated as a presenter. Other defaults may also apply such as individuals having particular credentials within an organization may be deemed as producers.

At operation 906, the system determines a one or more permissions 163 for individual users, such as a first user 162A and a second user 162B of the plurality of users 162 based on individual roles 161 determined in operation 904. In some configurations, the one or more permissions 163 define levels of control of one or more communication session resources 210 or levels of control of one or more communication session operations 211. In general, permissions granting a level of control over resources include rights content. For instance, a first level control can include read and write access at a second level of control can include read-only access. Permissions granting a level of control over other types of resources, such as hardware, can allow users to control microphones, speakers, etc. For instance, a first level of control can allow a user to control a microphone sensitivity level and the second level of control can allow a user to control the sensitivity level of a microphone as well as use the microphone to contribute an audio signal to a particular communication stream.

Permissions granting a level of control over operations allows users to control access rights of other users and other functions, such as special-effects, user interface arrangement editing features, hand raising features, etc. in one illustrative example, a first level of control over in operation may allow a user to view an output signal of a special effect, e.g., view a filtered video rendering, while a second level of control may allow a user to control the special effect, e.g., control which video signals are applied to the special effect, as well as view the output signal of the special effect.

At operation 908, the system can control one or more user interfaces displayed on multiple devices according to the determined roles and permissions. In one illustrative example, shown in FIG. 8A, a user interface arrangement may be selected based on a collection of roles for the participants. For instance, if a number of participants are in a communication session each having the same role, e.g., meeting participants, the system can cause a display of a user interface where each participant is depicted in renderings of equal size. In another example, if the system determines that a single user is a presenter and a number of other users are muted audience members with limited hand raising capabilities, the system may cause the display of a user interface arrangement having a larger rendering of the presenter and smaller renderings of the audience members. The system can also control volume levels, microphone sensitivity levels, and the activation of certain devices, such as video cameras, based on roles and/or permissions of associated users.

At operation 910, the system can monitor user activity of a communication session, e.g., analyze user activity 111E associated with a data structure 101 defining an agenda 120, to determine if the user activity associated with one or more users 162A satisfies one or more criteria 1191 for initiating a role change for the one or more users 162A. In some configurations, a role change may be caused by a user input explicitly identifying a rule change for a user.

In some configurations, a role change may be based on the detection of particular activity. For example, a user entering a communication session having a particular level within a company, such as a CEO, can cause a role of an existing presenter to be reduced or de-escalated to an audience member. In turn, this may reduce the permissions of that presenter to audio only and also to certain operations such as hand raising capabilities.

In some configurations, where there is a limit on a number of presenters, the system may analyze organizational data to determine if an exception is to be applied. For example, referring to the above example involving CEO, if the system had a limit on a number of presenters and an entering participant had a threshold priority, e.g., a CEO, the system can create an exception on a limit of presenters and grant rights for that person to take over a presenter role. In such embodiments, in response to the incoming presenter, a current presenter may be de-escalated to an audience member role. However, if the entering participant did not have a threshold priority, e.g., a middle-level manager, the system may only grant that entering participant rights as an audience member.

In some configurations, a role change may be based on the detection of changes to content, such as a file or an agenda. For instance, if a user edits a PowerPoint presentation and adds a person as a presenter, the system may detect this change within the file and sign a presenter role to the person named in the document. In turn, the system can then assign permissions for that person's designated role, e.g., allow them to broadcast a video stream of themselves as well as share content to a broad audience. In some configurations, the system can only change roles based on modifications to a file that is associated with a user having administrative rights, e.g., a threshold level of control over the file.

In operation 912, the system can modify the one or more permissions 163 for the one or more users 162A in response to determining that the user activity 111E associated with the one or more users 162A satisfies the one or more criteria 1191. The modification of the permissions 163 comprises at least one of a modification of the levels of control of the communication session resources 210 or levels of control of one or more communication session operations 211. In some embodiments, the system can escalate or de-escalate permissions when certain activity is detected, e.g., changes to shared content or changes to an agenda, can cause a person to be escalated to presenter, or other activity, as noted above, can cause a person to be de-escalated to an audience member from a presenter role.

At operation 914, the system can then update one or more user interfaces displayed on multiple devices according to the modified roles and permissions. In one illustrative example, shown in FIG. 8B, a user interface arrangement may be changed when an event type is modified and/or when roles are modified. In some embodiments, when an event type is changed, the new event type may have a fixed set of roles for each participant. Thus, user is moving from one event type to a new event type because each person to have new roles that are commensurate with the new event type. For example, when an event type moves from a status meeting to a webinar, the status meeting may have a presenter and a number of audience members having a level of control that allows each audience member to receive video data and have access to hand raising capabilities. However, when the system transitions to the webinar event type, the system may modify the role of the presenter to have a presenter role as well as a producer role, which allows that user to change user interface arrangements for each audience member. At the same time, the audience members may transition to another role that only allows them to view shared content and shared video streams, without access to the hand raising functionality.

At operation 916, the system can communicate any type of activity data to a machine learning service, for adjusting criteria and/or thresholds to be used in future iterations of the routine 900. For instance, if a particular group of users routinely meet and each meeting has a set of customized roles, the system can generate activity data so the routine can automatically select roles of each user in future events based on a given pattern. In one illustrative example, consider a group of users that routinely meet with the first set of roles, where every person has a presenter role or a contributor role, where each user can access an equal amount of stored information as peers. In addition to this routine meeting, the same group of individuals can also routinely meet with the second set of roles, where one person is routinely established as a moderator in advance sharing a specific content type, such as a recorded video stream or a spreadsheet having a particular title or other characteristic. These patterns can be established such that future events can identify these characteristics of each event and establish roles when similar patterns of behavior and share content are detected. As shown, the routine 900 can return to operation 902 to repeat the routine using the any adjusted thresholds, criteria, etc.

In some configurations, and operation 916, the system can also adjust permissions that are associated with a particular role based on various types of input data. For instance, if a system initially associates audience roles with read-only permissions for content and hand raising functionality, the system may change those associated permissions if an administrator or a user with a threshold level of control, makes a threshold number of changes over time. In one illustrative example, the system may remove the hand raising functionality for a specific group of audience members if an administrator removes that functionality from a threshold number of events over a predetermined time period. In addition, the system may increase a level of access, e.g., grant audience members read and write capabilities to content, if an administrator gives that functionality to a certain group of people over a predetermined time. Thus, the initial set of permissions, e.g. the permissions that are initially granted to a particular group of users, based on an initial set of roles may change over time for that particular group of users. Thus, if a meeting in the future includes additional users, those additional users may not receive the updated set of permissions.

In some configurations, the routine 900 can adjust permissions and roles based on one or more thresholds that limit the number of participants of an event or limit a particular role. For example, consider a scenario where the user activity comprises receiving additional input data indicating that a new user has joined the event. In such a scenario, the system may determine if an addition of the new user causes the system to exceed a threshold number of a particular role, e.g., a threshold number of presenters. In response to determining that the addition of the new user causes the system to exceed the threshold number of presenters, assigning the new user a first role having permissions that restrict the new user from presenting content of a file to the plurality of users, and that allows the new user to view other content shared by at least one of the plurality of users.

In some configurations, details of the agenda can influence the roles and permissions. The system can make an exception on a limit of users, such as a limit on a number of presenters. In the example described above, if the agenda names the new user entering the event, the system allow them to be a presenter despite the limit of presenters. This allows the system to limit the number of presenters, and then when a director or producer or any other person with permissions to edit the agenda changes the agenda to list that new user, the system can allow that edit to change the permission to allow that new user to be a presenter despite the limit. In continuing the above-described example, the system can determine that the agenda identifies the new user as a presenter. This may occur when a director edits the agenda after seeing that the new user has entered a meeting and was denied access as a presenter. In response to determining that the agenda identifies the new user as a presenter, the system can assign the new user a second role having permissions that allow the new user to present the content of the file to the plurality of users.

In some configurations, the permissions may be limited by a time duration or conditioned based on an event. For instance, consider a scenario where a user is granted permissions based on the fact that they are named as a presenter and a slide deck. In this example, the user is named as a presenter for the first five slides of a slide deck having one hundred slides. The user can be granted permissions associated with a presenter role for the first portion of a meeting for a duration that is commensurate with the number of slides naming them as a presenter. Thus, when the system detects that slides are presented in an event, e.g., an on-line conference, the user can be escalated to a presenter role and the corresponding permissions, but as soon as the presentation moves beyond those five slides, that presenter role is removed and they can be de-escalated to another role such as an audience member. The system also estimate an amount of time for presentation corresponding to the number of slides or the number of pages of documents. The system can grant a particular role, such as a presenter role, for that amount of time.

The system can utilize both the time duration and/or the feature detecting the display content so that a user's role may be de-escalated in either event of a time duration expiring or when the system detects that slides corresponding to that user are longer displayed to users of the event. In such embodiments, the system can analyze one or more sections of a file shared in association with the event to determine a number of sections that are associated with a particular user. The system can calculate any quantity of content and then determine a duration based on the quantity of content, i.e., a higher quantity of content for a person can increase a duration of any escalated or deescalated rights. Then the system can associate a duration with the permissions granting an escalated level of control of the one or more communication resources or an escalated level of control of the one or more session operations, wherein the modification of the one or more permissions is controlled by the duration. For example, an escalated level of control can include a transition from a view only level to a level that includes sharing information, modifying UI arrangements of others users, and up to an administrative level.

In some configurations, the routine 900 can cause a system to adjust permissions and roles based on the agenda and edits to the agenda. For instance, the routine can cause a system to analyze modifications to the agenda for determining if the role change is to occur. The user activity satisfies one or more criteria for initiating the role change for the one or more users when the modification to the agenda indicates a task for the one or more users, and wherein the modification of the one or more permissions are based on permissions associated with a new role, and the modification of the one or more permissions for the one or more users allow execution of operations or access to resources for performing the task. For example, if an agenda indicates that a person is a presenter, the system will associate that person with a presenter role in grant permissions for allowing that person to carry out any associated tasks, such as sharing content, presenting videos, controlling a volume of an audience, etc. this enables the system to allow a person with appropriate credentials to edit and agenda and allow to take action on that agenda without requiring an administrator to change permissions for that user. This type of feature can provide a real-time response that allows users to continue with the meeting without taking a positive change permissions. A system that provides a more granular level of control over permissions helps the system increase the security level over stored content as well as allowing the system to efficiently facilitate a communication session with minimal interruption. Such benefits saves resources, including computational resources, memory resources, and bandwidth, by allowing users to complete events in a more timely manner.

In some configurations, the routine 900 can cause a system to adjust permissions and roles based on shared content. For example, the routine can cause a system to analyze shared content associated with an event for determining if the role change is to occur. Shared content shared can include files, text messages, video streams, audio streams, recordings, etc. The user activity satisfies one or more criteria for initiating the role change for the one or more users when the shared content indicates a task for the one or more users. A task can be detected from existing content or edits to share content. The modification of the one or more permissions are based on permissions associated with a new role. As described herein, some permissions can be associated with a particular role. Thus, if a new role is indicated in content by a description of a task for a person, the associated permissions can be selected based on that identified role. The modification of the one or more permissions for the one or more users can allow execution of the session operations or access to session resources for performing the task.

In some configurations, the system generates an agenda from input data to determine roles. The data can include, but is not limited to, shared content, user identities, data defining an event type, or any other content shared in any suitable format. For instance, shared content can include an image, video, or text that is displayed on a screen that is viewed by multiple users. Shared content can include files, messages, image data, text data, or content shared on a screen, such as a shared desktop. The roles are used to determine permissions, and the permissions control access to the shared content and other system operations.

For example, in a method for managing permissions of a plurality of users of a communication session 1104 for a system 100, the method configured for execution on the system 100 can include analyzing input data 111 comprising at least one of shared content 111A or identities of a plurality of users 162 to generate a data structure 101 defining an agenda 120 of an event 102 associated with a communication session 1104. Thus, operation 902 can include an analysis that interprets the input data to determine one or more roles 205 for the plurality of users 162 for individual sections 160 of the agenda 120. For instance, the system can analyze a document shared by a user or content shared on the screen of a user to determine if text indicates that a particular person is to be a presenter, audience member, producer, etc. Similar to the other embodiments described herein, the shared content or any other type of input data can be utilized to generate an agenda. Various indicators of shared content, or any other type of input data described herein, can be used to identify sections of an agenda. The system can also identify particular topics of the shared content in a duration of each section can be based on a quantity of content for a particular section, such as an introduction, a presentation, or a conclusion.

Once the agenda and the roles are identified, the system can determine one or more permissions 163 for individual users 162A and 162B of the plurality of users 162 based on the one or more roles 205 determined for the plurality of users 162. The one or more permissions 163 define a level of control of a communication session resource 210 for at least one section 160 of the agenda 120 or a level of control of a communication session operation 211 for the at least one section 160 of the agenda 120. The control of resources controls access content and hardware, and control over operations can enable the system to control execution of session functions, e.g., hand raising functions, administrative functions, and UI layout control functions.

The system 100 can then provide the individual users access to the communication session resource 210 according to the level of control of the communication session resource 210 associated with the individual users or provide the individual users control of the communication session operation 211 according to the level of control of the communication session operations 211 associated with the individual users.

In another illustrative embodiment, in a method for managing permissions of a plurality of users of a communication session 1104 for a system 100, the method configured for execution on the system 100 can include operations for analyzing a data structure 101 defining an agenda 120 of an event 102 associated with the communication session 1104. For example, in operation 904, the system can determine based on the data structure defining the agenda, one or more roles 205 for the plurality of users 162 for individual sections 160 of the agenda 120 according to respective users associated with the individual sections or associated with at least one of shared content 111A specified in the data structure defining the agenda.

Then, as shown in operation 904, the system can determine one or more permissions 163 for individual users 162A and 162B of the plurality of users 162 based on the one or more roles 205 determined for the plurality of users 162. The one or more permissions 163 define a level of control of a communication session resource 210 for at least one section 160 of the agenda 120 or a level of control of a communication session operation 211 for the at least one section 160 of the agenda 120. Thus system can then provide the individual users access to the communication session resource 210 according to the level of control of the communication session resource 210 associated with the individual users or provide the individual users control of the communication session operation 211 according to the level of control of the communication session operations 211 associated with the individual users.

Figure 10:
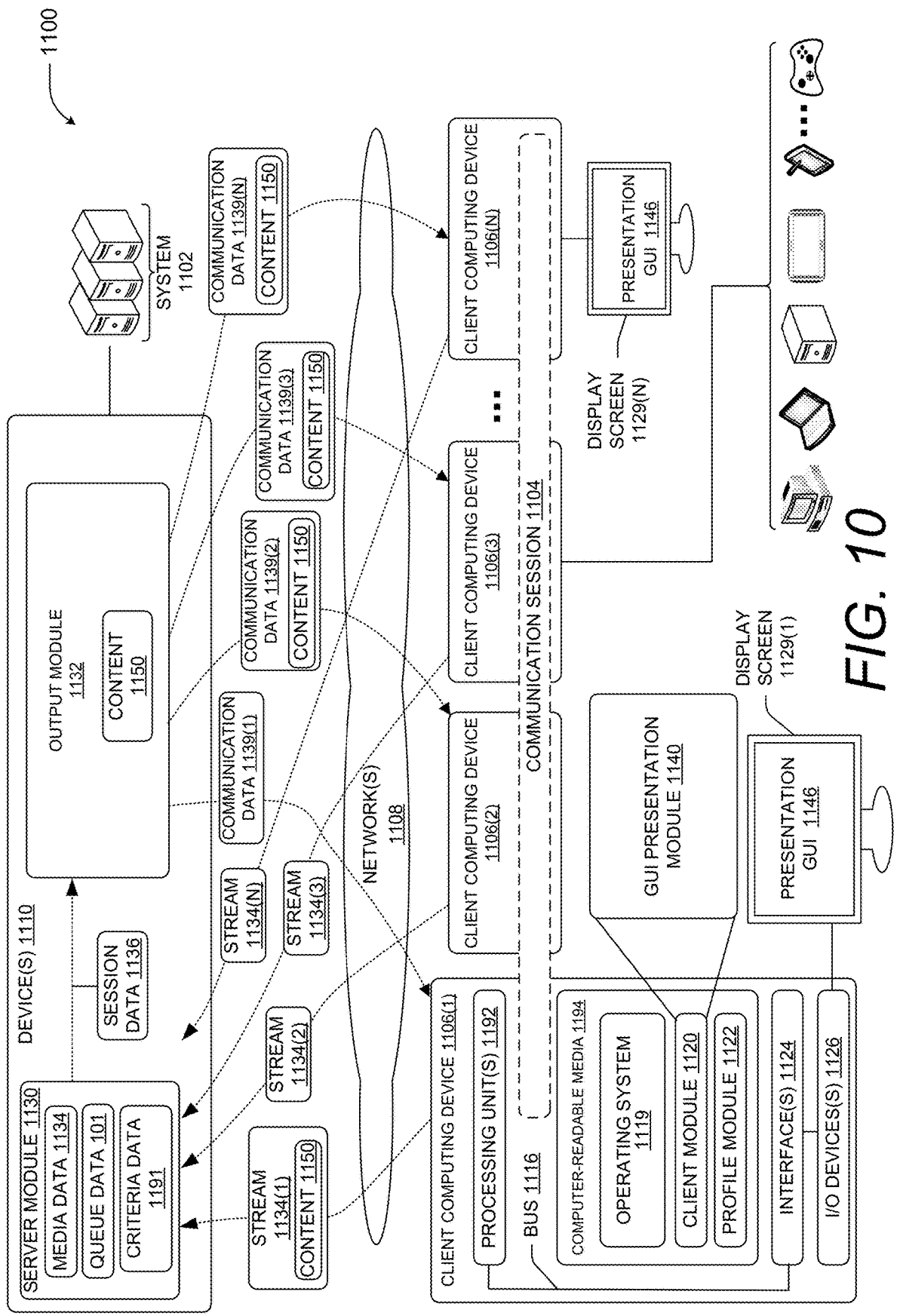
FIG. 10 is a computing system diagram showing aspects of an illustrative operating environment for the techniques disclosed herein.

FIG. 10 is a diagram illustrating an example environment 1100 in which a system 1102 (which can be system 100 of FIG. 1) can implement the techniques disclosed herein. In some implementations, a system 1102 may function to collect, analyze, and share data defining one or more objects that are displayed to users of a communication session 1104.

As illustrated, the communication session 1104 may be implemented between a number of client computing devices 1106(1) through 1106(N) (where N is a number having a value of two or greater) that are associated with the system 1102 or are part of the system 1102. The client computing devices 1106(1) through 1106(N) enable users, also referred to as individuals, to participate in the communication session 1104.

In this example, the communication session 1104 is hosted, over one or more network(s) 1108, by the system 1102. That is, the system 1102 can provide a service that enables users of the client computing devices 1106(1) through 1106(N) to participate in the communication session 1104 (e.g., via a live viewing and/or a recorded viewing). Consequently, a "participant" to the communication session 1104 can comprise a user and/or a client computing device (e.g., multiple users may be in a room participating in a communication session via the use of a single client computing device), each of which can communicate with other participants. As an alternative, the communication session 1104 can be hosted by one of the client computing devices 1106(1) through 1106(N) utilizing peer-to-peer technologies. The system 1102 can also host chat conversations and other team collaboration functionality (e.g., as part of an application suite).

In some implementations, such chat conversations and other team collaboration functionality are considered external communication sessions distinct from the communication session 1104. A computerized agent configured to collect participant data in the communication session 1104 may be able to link to such external communication sessions. Therefore, the computerized agent may receive information, such as date, time, session particulars, and the like, that enables connectivity to such external communication sessions. In one example, a chat conversation can be conducted in accordance with the communication session 1104. Additionally, the system 1102 may host the communication session 1104, which includes at least a plurality of participants co-located at a meeting location, such as a meeting room or auditorium, or located in disparate locations.

In examples described herein, client computing devices 1106(1) through 1106(N) participating in the communication session 1104 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that captures the appearance and speech of a user participating in the communication session). In some implementations, the video feeds may comprise such audio and visual data, one or more still images, and/or one or more avatars. The one or more still images may also comprise one or more avatars.

Another example of an individual stream of live and/or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live and/or recorded content within the communication data enable a remote meeting to be facilitated between a group of people and the sharing of content within the group of people. In some implementations, the various streams of live and/or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 1104 live as activity occurs, or alternatively, via a recording at a later time after the activity occurs. In examples described herein, client computing devices 1106(1) through 1106(N) participating in the communication session 1104 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee of a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 1102 includes device(s) 1110. The device(s) 1110 and/or other components of the system 1102 can include distributed computing resources that communicate with one another and/or with the client computing devices 1106(1) through 1106(N) via the one or more network(s) 1108. In some examples, the system 1102 may be an independent system that is tasked with managing aspects of one or more communication sessions such as communication session 1104. As an example, the system 1102 may be managed by entities such as SLACK, WEBEX, GOTOMEETING, GOOGLE HANGOUTS, etc.

Network(s) 1108 may include, for example, public networks such as the Internet, private networks such as an institutional and/or personal intranet, or some combination of private and public networks. Network(s) 1108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 1108 may utilize communications protocols, including packet-based and/or datagram-based protocols such as Internet protocol ("IP"), transmission control protocol ("TCP"), user datagram protocol ("UDP"), or other types of protocols. Moreover, network(s) 1108 may also include a number of devices that facilitate network communications and/or form a hardware basis for the networks, such as switches, routers, gateways, access points, firewalls, base stations, repeaters, backbone devices, and the like.

In some examples, network(s) 1108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 1110 may include one or more computing devices that operate in a cluster or other grouped configuration to share resources, balance load, increase performance, provide fail-over support or redundancy, or for other purposes. For instance, device(s) 1110 may belong to a variety of classes of devices such as traditional server-type devices, desktop computer-type devices, and/or mobile-type devices. Thus, although illustrated as a single type of device or a server-type device, device(s) 1110 may include a diverse variety of device types and are not limited to a particular type of device. Device(s) 1110 may represent, but are not limited to, server computers, desktop computers, web-server computers, personal computers, mobile computers, laptop computers, tablet computers, or any other sort of computing device.

A client computing device (e.g., one of client computing device(s) 1106(1) through 1106(N)) may belong to a variety of classes of devices, which may be the same as, or different from, device(s) 1110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 1106(1) through 1106(N) of the various classes and device types can represent any type of computing device having one or more data processing unit(s) 1192 operably connected to computer-readable media 1194 such as via a bus 1116, which in some instances can include one or more of a system bus, a data bus, an address bus, a PCI bus, a Mini-PCI bus, and any variety of local, peripheral, and/or independent buses.

Executable instructions stored on computer-readable media 1194 may include, for example, an operating system 1119, a client module 1120, a profile module 1122, and other modules, programs, or applications that are loadable and executable by data processing units(s) 1192.

Client computing device(s) 1106(1) through 1106(N) may also include one or more interface(s) 1124 to enable communications between client computing device(s) 1106(1) through 1106(N) and other networked devices, such as device(s) 1110, over network(s) 1108. Such network interface(s) 1124 may include one or more network interface controllers (NICs) or other types of transceiver devices to send and receive communications and/or data over a network.

Moreover, client computing device(s) 1106(1) through 1106(N) can include input/output ("I/O") interfaces (devices) 1126 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 10 illustrates that client computing device 1106(1) is in some way connected to a display device (e.g., a display screen 1129(1)), which can display a UI according to the techniques described herein.

In the example environment 1100 of FIG. 10, client computing devices 1106(1) through 1106(N) may use their respective client modules 1120 to connect with one another and/or other external device(s) in order to participate in the communication session 1104, or in order to contribute activity to a collaboration environment. For instance, a first user may utilize a client computing device 1106(1) to communicate with a second user of another client computing device 1106(2). When executing client modules 1120, the users may share data, which may cause the client computing device 1106(1) to connect to the system 1102 and/or the other client computing devices 1106(2) through 1106(N) over the network(s) 1108.

The client computing device(s) 1106(1) through 1106(N) may use their respective profile modules 1122 to generate participant profiles (not shown in FIG. 10) and provide the participant profiles to other client computing devices and/or to the device(s) 1110 of the system 1102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 10, the device(s) 1110 of the system 1102 include a server module 1130 and an output module 1132. In this example, the server module 1130 is configured to receive, from individual client computing devices such as client computing devices 1106(1) through 1106(N), media streams 1134(1) through 1134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 1130 is configured to receive a collection of various media streams 1134(1) through 1134(N) during a live viewing of the communication session 1104 (the collection being referred to herein as "media data 1134"). In some scenarios, not all of the client computing devices that participate in the communication session 1104 provide a media stream. For example, a client computing device may only be a consuming, or a "listening," device such that it only receives content associated with the communication session 1104 but does not provide any content to the communication session 1104. A communication session 1104 can have a start time and an end time, or a communication session 1104 can be ongoing. A communication session 1104 can also be categorized as an event and have stages, with each stage causing a computer to change roles for individual users as an event transitions through each stage.

In various examples, the server module 1130 can select aspects of the media streams 1134 that are to be shared with individual ones of the participating client computing devices 1106(1) through 1106(N). Consequently, the server module 1130 may be configured to generate session data 1136 based on the streams 1134 and/or pass the session data 1136 to the output module 1132. Then, the output module 1132 may communicate communication data 1139 to the client computing devices (e.g., client computing devices 1106(1) through 1106(N) participating in a live viewing of the communication session). The communication data 1139 may include video, audio, and/or other content data, provided by the output module 1132 based on content 1150 associated with the output module 1132 and based on received session data 1136. The device(s) 1110 of the system 1102 can also access queue data 101 described above in connection with FIG. 1, and criteria data 1191 for defining criteria and/or thresholds described herein. The criteria data 1191 can also include machine learning data accessible by a machine learning service or a machine learning module, which can be part of the server module 1130 or part of a remote machine learning service, such as those that are accessible by a public API at a site run by IBM, Google, or Microsoft.

As shown, the output module 1132 transmits communication data 1139(1) to client computing device 1106(1), and transmits communication data 1139(2) to client computing device 1106(2), and transmits communication data 1139(3) to client computing device 1106(3), etc. The communication data 1139 transmitted to the client computing devices can be the same or can be different (e.g., positioning of streams of content within a user interface may vary from one device to the next).

In various implementations, the device(s) 1110 of the system 1102 and/or the client module 1120 can include GUI presentation module 1140. The GUI presentation module 1140 may be configured to analyze communication data 1139 that is for delivery to one or more of the client computing devices 1106. Specifically, the UI presentation module 1140, at the device(s) 1110 and/or the client computing device 1106, may analyze communication data 1139 to determine an appropriate manner for displaying video, image, and/or content on the display screen 1129 of an associated client computing device 1106. In some implementations, the GUI presentation module 1140 may provide video, images, and/or content to a presentation GUI 1146 rendered on the display screen 1129 of the associated client computing device 1106. The presentation GUI 1146 may be caused to be rendered on the display screen 1129 by the GUI presentation module 1140. The presentation GUI 1146 may include the video, images, and/or content analyzed by the GUI presentation module 1140.

In some implementations, the presentation GUI 1146 may include a plurality of sections or grids that may render or comprise video, image, and/or content for display on the display screen 1129. For example, a first section of the presentation GUI 1146 may include a video feed of a presenter or individual, and a second section of the presentation GUI 1146 may include a video feed of an individual consuming meeting information provided by the presenter or individual. The GUI presentation module 1140 may populate the first and second sections of the presentation GUI 1146 in a manner that properly imitates an environment experience that the presenter and the individual may be sharing.

In some implementations, the GUI presentation module 1140 may enlarge or provide a zoomed view of the individual represented by the video feed in order to highlight a reaction, such as a facial feature, the individual had to the presenter. In some implementations, the presentation GUI 1146 may include a video feed of a plurality of participants associated with a meeting, such as a general communication session. In other implementations, the presentation GUI 1146 may be associated with a channel, such as a chat channel, enterprise teams channel, or the like. Therefore, the presentation GUI 1146 may be associated with an external communication session that is different than the general communication session.

Figure 11:
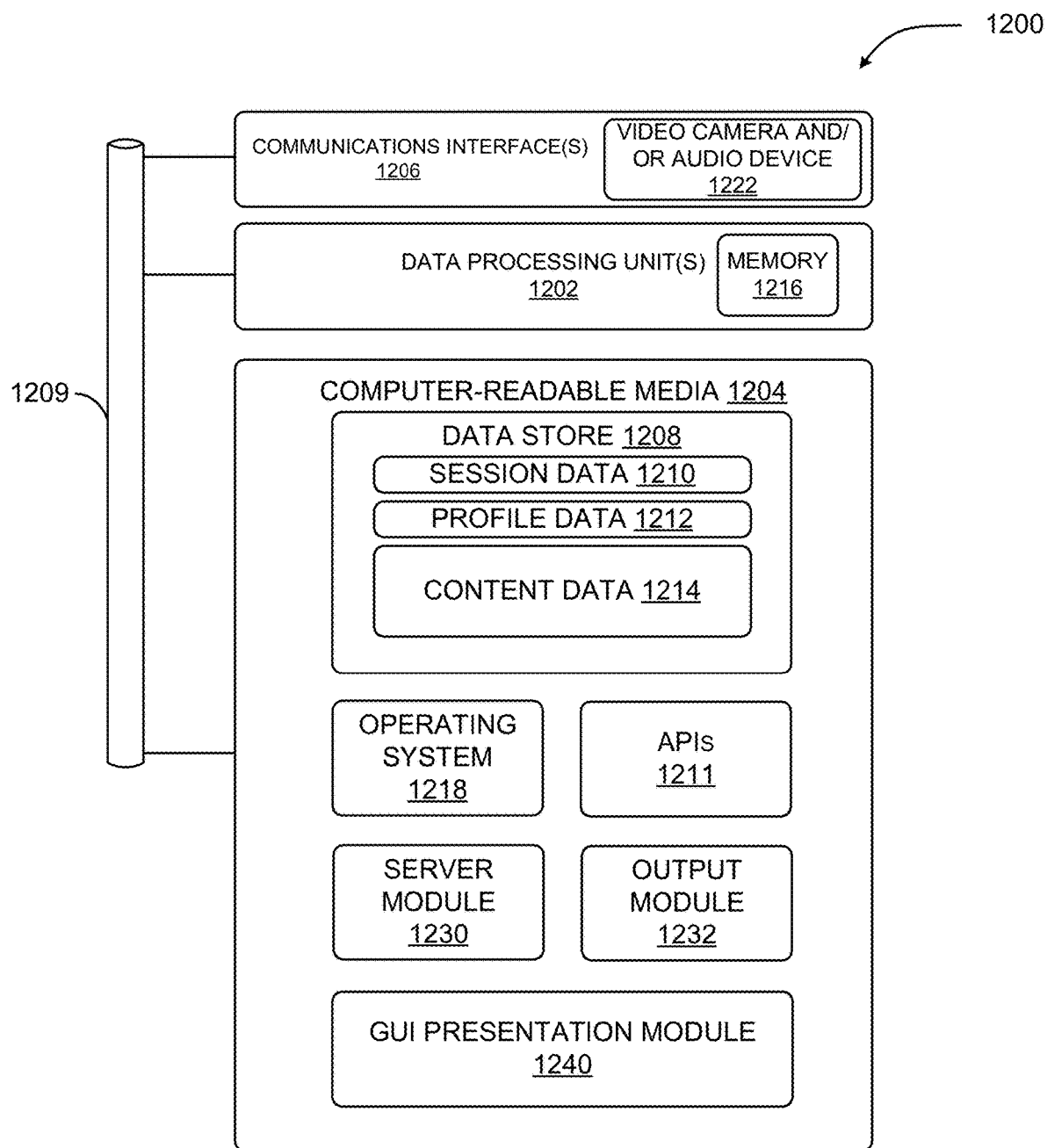
FIG. 11 is a computing architecture diagram showing aspects of the configuration and operation of a computing device that can implement aspects of the techniques disclosed herein.

FIG. 11 illustrates a diagram that shows example components of an example device 1200 (also referred to herein as a "computing device") configured to generate and process data for some of the user interfaces disclosed herein. The device 1200 may generate data that may include one or more sections that may render or comprise video, images, and/or content for display on the display screen 1129. The device 1200 may represent one of the device(s) described herein. Additionally, or alternatively, the device 1200 may represent one of the client computing devices 1106.

As illustrated, the device 1200 includes one or more data processing unit(s) 1202, computer-readable media 1204 (also referred to herein as computer storage medium 1204), and communication interface(s) 1206. The components of the device 1200 are operatively connected, for example, via a bus 1209, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1202 and/or data processing unit(s) 1192, may represent, for example, a CPU-type data processing unit, a GPU-type data processing unit, a field-programmable gate array ("FPGA"), another class of digital signal processors ("DSPs"), or other hardware logic components that may, in some instances, be driven by a CPU. For example, and without limitation, illustrative types of hardware logic components that may be utilized include Application-Specific Integrated Circuits ("ASICs"), Application- Specific Standard Products ("ASSPs"), System-on-a-Chip Systems ("SOCs"), Complex Programmable Logic Devices ("CPLDs"), etc.

As utilized herein, computer-readable media, such as computer-readable media 1204 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. "Computer storage media," "non-transitory computer storage media," or "non-transitory computer-readable media" may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media or variants of this term noted above includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or any storage medium that can be used to locally store and maintain information for access at a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 1206 may represent, for example, network interface controllers ("NICs") or other types of transceiver devices to send and receive communications over a network. Furthermore, the communication interface(s) 1206 may include one or more video cameras and/or audio devices 1222 to enable generation of video feeds and/or still images, and so forth.

In the illustrated example, computer-readable media 1204 includes a data store 1208. In some examples, the data store 1208 includes data storage such as a database, data warehouse, or other type of structured or unstructured data storage. In some examples, the data store 1208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1208 may store data for the operations of processes, applications, components, and/or modules stored in computer-readable media 1204 and/or executed by data processing unit(s) 1202 and/or accelerator(s). For instance, in some examples, the data store 1208 may store session data 1210, profile data 1212 (e.g., associated with a participant profile), and/or other data. The session data 1210 can include a total number of participants (e.g., users and/or client computing devices) in a communication session, activity that occurs in the communication session, a list of invitees to the communication session, and/or other data related to when and how the communication session is conducted or hosted. The data store 1208 may also include content data 1214, such as the content that includes video, audio, or other content for rendering and display on one or more of the display screens 1129.

Alternately, some or all of the above-referenced data can be stored on separate memories 1216 on board one or more data processing unit(s) 1202 such as a memory on board a CPU-type processor, a GPU-type processor, an FPGA-type accelerator, a DSP-type accelerator, and/or another accelerator. In this example, the computer-readable media 1204 also includes an operating system 1218 and application programming interface(s) 1210 (APIs) configured to expose the functionality and the data of the device 1200 to other devices. Additionally, the computer-readable media 1204 includes one or more modules such as the server module 1230, the output module 1232, and the GUI presentation module 1240, although the number of illustrated modules is just an example, and the number may vary higher or lower. That is, functionality described herein in association with the illustrated modules may be performed by a fewer number of modules or a larger number of modules on one device or spread across multiple devices.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof. In addition, the words "that" or "if" can used interchangeably. Thus, a phrase such as "determining that criteria is satisfied" can be also interpreted as "determining if criteria is satisfied" and vice versa.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

I claim:

1. A method for managing permissions of a plurality of users of a communication session for a system, the method configured for execution on the system comprising:
   analyzing a data structure defining an agenda of an event associated with the communication session;
   determining, by the system, based on the data structure defining the agenda, one or more roles for the plurality of users for individual sections of the agenda according to respective users associated with the individual sections or associated with shared content specified in the data structure defining the agenda, wherein individual roles determined from the agenda correspond to different access rights;
   determining, by the system, one or more permissions for individual users of the plurality of users based on the one or more roles determined for the plurality of users, wherein the one or more permissions grants a first access right based on a first role of a user for at least one section of the agenda and a second access right based on a second role of the user for another section of the agenda; and
   causing the system to provide the user with control of the communication session using the different access rights that correspond to the individual roles during individual sections of the communication session that are associated with the first role and the second role of the user.

2. The method of claim 1, further comprising:
   determining that an addition of a new user causes the system to exceed a threshold number of users for a predetermined role; and
   in response to determining that the addition of the new user causes the system to exceed the threshold number of users for the predetermined role, assigning the new user a secondary role having permissions that restrict the new user from performing at least one communication session operation associated with the predetermined role.

3. The method of claim 1, further comprising:
   determining that an addition of a new user causes the system to exceed a threshold number of presenters; and
   in response to determining that the addition of the new user causes the system to exceed the threshold number of presenters, assigning the new user a secondary role having permissions that restrict the new user from performing at least one communication session operation that is associated with the presenter role.

4. The method of claim 1, further comprising:
   analyzing a file shared in association with the event to identify an indication of a role change of a particular user;
   analyzing one or more sections of the file shared in association with the event to determine a quantity of content that is associated with the particular user; and
   determining a duration of the role change based on the quantity of content that is associated with the particular user, wherein the role change causes the system to modify permissions granting the first access right based on the first role of the user for the at least one section of the agenda and the second access right based on the second role for the user for another section of the agenda, wherein the modification of the one or more permissions is limited to the duration.

5. The method of claim 1, further comprising:
   analyzing input data, including shared content, an event type, identities of the plurality of users, or an analysis of historical data identifying previous roles of the plurality of users to determine roles for the individual users of the plurality of users; and
   generating the data structure defining the agenda of the event, wherein the data structure indicates the one or more roles for the individual users and the individual sections of the agenda that are each associated with the one or more roles.

6. The method of claim 1, further comprising:
   determining if the plurality of users are associated with a threshold number of past events of an event type; and
   in response to determining that the plurality of users are associated with a threshold number of past events of the event type, assigning the one or more roles of the event using previous roles of the past events for each of the plurality of users.

7. The method of claim 1, further comprising:
   analyzing modifications to the agenda to determine if the modifications indicate a new role for at least one user of the plurality of users;
   generating modified permissions for the at least one user in response to determining that the modifications to the agenda indicate the new role for at least one user; and
   causing the system to provide the at least one user access to the communication session resource according to the modified permissions or provide the at least one user control of the communication session operation according to the modified permissions.

8. The method of claim 1, further comprising:
   analyzing modifications to shared content to determine if the modifications indicate a new role for at least one user of the plurality of users;
   generating modified permissions for the at least one user in response to determining that the modifications to the shared content indicate the new role for at least one user; and
   causing the system to provide the at least one user access to the communication session resource according to the modified permissions or provide the at least one user control of the communication session operation according to the modified permissions.

9. A system for managing permissions of a plurality of users of a communication session, the system comprising:
   one or more data processing units; and
   a computer storage medium having encoded thereon computer-executable instructions to cause the one or more data processing units to:
   analyze a data structure defining an agenda of an event associated with the communication session;
   determine, based on the data structure defining the agenda, one or more roles for the plurality of users for individual sections of the agenda according to respective users associated with the individual sections or associated with shared content specified in the data structure defining the agenda, wherein individual roles determined from the agenda correspond to different access rights;
   determine one or more permissions for individual users of the plurality of users based on the one or more roles determined for the plurality of users, wherein the one or more permissions grants a first access right based on a first role of a user for at least one section of the agenda and a second access right based on a second role of the user for another section of the agenda; and cause the system to provide the user with control of the communication session using the different access rights that correspond to the individual roles during individual sections of the communication session that are associated with the first role and the second role of the user.

10. The system of claim 9, wherein the instructions further cause the one or more data processing units to:
   determine that an addition of a new user causes the system to exceed a threshold number of users for a predetermined role; and
   in response to determining that the addition of the new user causes the system to exceed the threshold number of users for the predetermined role, assign the new user a secondary role having permissions that restrict the new user from performing at least one communication session operation associated with the predetermined role.

11. The system of claim 9, wherein the instructions further cause the one or more data processing units to:
   determine that an addition of a new user causes the system to exceed a threshold number of presenters; and
   in response to determining that the addition of the new user causes the system to exceed the threshold number of presenters, assign the new user a secondary role having permissions that restrict the new user from performing at least one communication session operation that is associated with the presenter role.

12. The system of claim 9, wherein the instructions further cause the one or more data processing units to:
   analyze a file shared in association with the event to identify an indication of a role change of a particular user;
   analyze one or more sections of the file shared in association with the event to determine a quantity of content that is associated with the particular user; and
   determine a duration of the role change based on the quantity of content that is associated with the particular user, wherein the role change causes the system to modify permissions granting the first access right based on the first role of the user for the at least one section of the agenda and the second access right based on the second role of the user for another section of the agenda, wherein the modification of the one or more permissions is limited to the duration.

13. The system of claim 9, wherein the instructions further cause the one or more data processing units to:
   analyze input data, including shared content, an event type, identities of the plurality of users, or an analysis of historical data identifying previous roles of the plurality of users to determine roles for the individual users of the plurality of users; and
   generate the data structure defining the agenda of the event, wherein the data structure indicates the one or more roles for the individual users and the individual sections of the agenda that are each associated with the one or more roles.

14. The system of claim 9, wherein the instructions further cause the one or more data processing units to:
   determine if the plurality of users are associated with a threshold number of past events of an event type; and
   in response to determining that the plurality of users are associated with a threshold number of past events of the event type, assign the one or more roles of the event using previous roles of the past events for each of the plurality of users.

15. The system of claim 9, wherein the instructions further cause the one or more data processing units to:
   analyze modifications to the agenda to determine if the modifications indicate a new role for at least one user of the plurality of users;
   generating modified permissions for the at least one user in response to determining that the modifications to the agenda indicate the new role for at least one user; and
   causing the system to provide the at least one user access to the communication session resource according to the modified permissions or provide the at least one user control of the communication session operation according to the modified permissions.

16. The system of claim 9, wherein the instructions further cause the one or more data processing units to:
   analyze modifications to shared content to determine if the modifications indicate a new role for at least one user of the plurality of users;
   generate modified permissions for the at least one user in response to determining that the modifications to the shared content indicate the new role for at least one user; and
   cause the system to provide the at least one user access to the communication session resource according to the modified permissions or provide the at least one user control of the communication session operation according to the modified permissions.

17. A system for managing permissions of a plurality of users of a communication session, comprising:
   means for analyzing a data structure defining an agenda of an event associated with the communication session;
   means for determining, based on the data structure defining the agenda, one or more roles for the plurality of users for individual sections of the agenda according to respective users associated with the individual sections or associated with shared content specified in the data structure defining the agenda, wherein individual roles determined from the agenda correspond to different access rights;
   means for determining one or more permissions for individual users of the plurality of users based on the one or more roles determined for the plurality of users, wherein the one or more permissions grants a first access right based on a first role of a user for at least one section of the agenda and a second access right based on a second role of the user for another section of the agenda; and
   means for causing the system to provide the user with control of the communication session using the different access rights that correspond to the individual roles during individual sections of the communication session that are associated with the first role and the second role of the user.

18. The system of claim 1, further comprising:
   means for determining that an addition of a new user causes the system to exceed a threshold number of users for a predetermined role; and
   means for assigning the new user a secondary role having permissions that restrict the new user from performing at least one communication session operation associated with the predetermined role, in response to determining that the addition of the new user causes the system to exceed the threshold number of users for the predetermined role.

19. The system of claim 1, further comprising:

means for determining that an addition of a new user causes the system to exceed a threshold number of presenters; and means for assigning the new user a secondary role having permissions that restrict the new user from performing at least one communication session operation that is associated with the presenter role, in response to determining that the addition of the new user causes the system to exceed the threshold number of presenters.

20. The system of claim 1, further comprising:

means for analyzing a file shared in association with the event to identify an indication of a role change of a particular user;

means for analyzing one or more sections of the file shared in association with the event to determine a quantity of content that is associated with the particular user; and means for determining a duration of the role change based on the quantity of content that is associated with the particular user, wherein the role change causes the system to modify permissions granting the first access right based on the first role of the user for the at least one section of the agenda and the second access right based on the second role for the user for another section of the agenda, wherein the modification of the one or more permissions is limited to the duration.

\* \* \* \* \*